US012591957B2

(12) United States Patent
Mohanty et al.

(10) Patent No.: US 12,591,957 B2
(45) Date of Patent: Mar. 31, 2026

(54) METHOD AND ELECTRONIC DEVICE FOR TILT CORRECTION OF VIDEO

(71) Applicant: Samsung Electronics Co., Ltd., Gyeonggi-do (KR)

(72) Inventors: Debi Prasanna Mohanty, Karnataka (IN); Sukumar Moharana, Karnataka (IN); Siddhant Garg, Karnataka (IN); Kadaru Sai Ravi Teja, Karnataka (IN); Siva Prasad Thota, Karnataka (IN); Vanraj Vala, Karnataka (IN); Dwaraka Bhamidipati Sreevatsa, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 336 days.

(21) Appl. No.: 18/343,589

(22) Filed: Jun. 28, 2023

(65) Prior Publication Data

US 2023/0385997 A1 Nov. 30, 2023

Related U.S. Application Data

(63) Continuation of application No. PCT/KR2023/006462, filed on May 12, 2023.

(30) Foreign Application Priority Data

May 27, 2022 (IN) .............................. 202241030409

(51) Int. Cl.
G06T 5/80 (2024.01)
G06T 3/60 (2006.01)
(Continued)

(52) U.S. Cl.
CPC ................. G06T 5/80 (2024.01); G06T 3/60 (2013.01); G06T 5/50 (2013.01); G06T 7/70 (2017.01);
(Continued)

(58) Field of Classification Search
CPC .... G06T 5/80; G06T 3/60; G06T 5/50; G06T 7/70; G06T 2207/10016;
(Continued)

(56) References Cited

U.S. PATENT DOCUMENTS 7,305,146 B2    12/2007 Cheatle
7,893,963 B2 *   2/2011 Gallagher .......... H04N 23/6811
                                              348/333.12
(Continued)

FOREIGN PATENT DOCUMENTS

EP        0 649 256 B1     10/2007
EP        2 999 210 A1      3/2016
(Continued)

OTHER PUBLICATIONS

International Search Report dated Aug. 17, 2023 for PCT/KR2023/006462.

(Continued)

*Primary Examiner* — Xuemei G Chen
(74) *Attorney, Agent, or Firm* — NIXON & VANDERHYE P.C.

(57) ABSTRACT

A method for tilt correction of a video by an electronic device. The method may include receiving a user selection of the video. The method may include identifying a sequence of image frames of the video representing a scene in the video. The method may include determining a degree of tilt in each image frame of the sequence of image frames. The method may include determining whether cause of tilt in the sequence of image frames is un-intentional by analyzing the degree of tilt in each image frame using a trained Artificial Intelligence (AI) model. The method may include performing the tilt correction on the sequence of image frames based on the cause of tilt being un-intentional.

13 Claims, 18 Drawing Sheets

300

Receiving a user selection of the video ~301

Identifying a sequence of image frames of the video representing a scene in the video ~302

Determining a degree of tilt in each image frame of the sequence of image frames ~303

Determining whether cause of tilt in the sequence of image frames is un-intentional by analyzing the degree of tilt in each image frame using a trained AI model ~304

Performing the tilt correction on the sequence of image frames in response to determining that the cause of tilt is un-intentional ~305

(51) Int. Cl.
  *G06T 5/50* (2006.01)
  *G06T 7/70* (2017.01)
(52) U.S. Cl.
  CPC .............. *G06T 2207/10016* (2013.01); *G06T 2207/20081* (2013.01); *G06T 2207/20132* (2013.01); *G06T 2207/30168* (2013.01)
(58) Field of Classification Search
  CPC . G06T 2207/20081; G06T 2207/20132; G06T 2207/30168; G06T 5/60; G06T 2207/20084; G06N 3/044; G06N 3/0464; G06N 3/048; G06N 3/09; G06N 3/092; H04N 23/6815; H04N 23/617; H04N 23/683
  See application file for complete search history.

(56) References Cited

U.S. PATENT DOCUMENTS

| | | | |
|---|---|---|---|
| 8,422,788 B2 | 4/2013 | Demandolx et al. | |
| 10,147,199 B2* | 12/2018 | Demarty ................... | G06T 7/20 |
| 11,341,605 B1* | 5/2022 | Singh ................... | H04L 67/1095 |
| 11,837,023 B2* | 12/2023 | Toizumi ............. | G06V 10/7715 |
| 2003/0016883 A1 | 1/2003 | Baron | |
| 2007/0297694 A1* | 12/2007 | Kurata ............... | H04N 23/6811 |
| | | | 382/284 |
| 2008/0008378 A1* | 1/2008 | Andel ................... | G06V 10/22 |
| | | | 382/141 |
| 2011/0149094 A1* | 6/2011 | Chen ................... | H04N 23/635 |
| | | | 348/E5.022 |
| 2011/0193978 A1* | 8/2011 | Wu .................... | H04N 21/4223 |
| | | | 348/208.6 |
| 2014/0085493 A1 | 3/2014 | Petrescu et al. | |

| | | | |
|---|---|---|---|
| 2014/0140609 A1* | 5/2014 | Krishnaswamy ....... | G06T 3/608 |
| | | | 382/199 |
| 2014/0212052 A1 | 7/2014 | Wei | |
| 2014/0355895 A1 | 12/2014 | Xu et al. | |
| 2015/0358551 A1 | 12/2015 | Chen et al. | |
| 2019/0325593 A1* | 10/2019 | Tokimitsu .............. | G01B 11/25 |
| 2020/0162770 A1* | 5/2020 | Pavetic ............ | H04N 21/23418 |
| 2020/0302247 A1* | 9/2020 | Immel ................... | G06V 10/764 |
| 2020/0335067 A1* | 10/2020 | Mavridis .................. | G09G 5/38 |
| 2020/0363815 A1* | 11/2020 | Mousavian .............. | G06T 7/75 |
| 2021/0027434 A1* | 1/2021 | Sheridan .................. | G06T 5/80 |
| 2021/0063200 A1* | 3/2021 | Kroepfl .................... | G06N 3/02 |
| 2021/0195119 A1 | 6/2021 | Omata et al. | |
| 2021/0407045 A1* | 12/2021 | Mironica ................. | G06T 3/40 |
| 2022/0108542 A1* | 4/2022 | Zhang ....................... | G06T 3/60 |
| 2022/0156885 A1* | 5/2022 | Jiang .................... | G06V 10/242 |
| 2023/0386622 A1* | 11/2023 | Needham ................. | G06T 7/70 |
| 2024/0040250 A1* | 2/2024 | Shi ....................... | H04N 23/683 |

FOREIGN PATENT DOCUMENTS

| | | | |
|---|---|---|---|
| JP | 2011-090437 A | 5/2011 |
| JP | 2021-100238 A | 7/2021 |
| WO | WO 2008/057841 A1 | 5/2008 |

OTHER PUBLICATIONS

Written Opinion dated Aug. 17, 2023 for PCT/KR2023/006462.
Siddhant Garg et al., 'A Simple Approach to Image Tilt Correction with Self-Attention MobileNet for Smartphones', arXiv:2111.00398v1, pp. 1-13, Oct. 31, 2021.
Extended European Search Report dated Feb. 27, 2025 for EP Application No. 23812044.8.
Indian Examination Report dated Jun. 6, 2025 issued in Indian Patent Application No. 202241030409, 8 pp.

* cited by examiner

FIG. 3

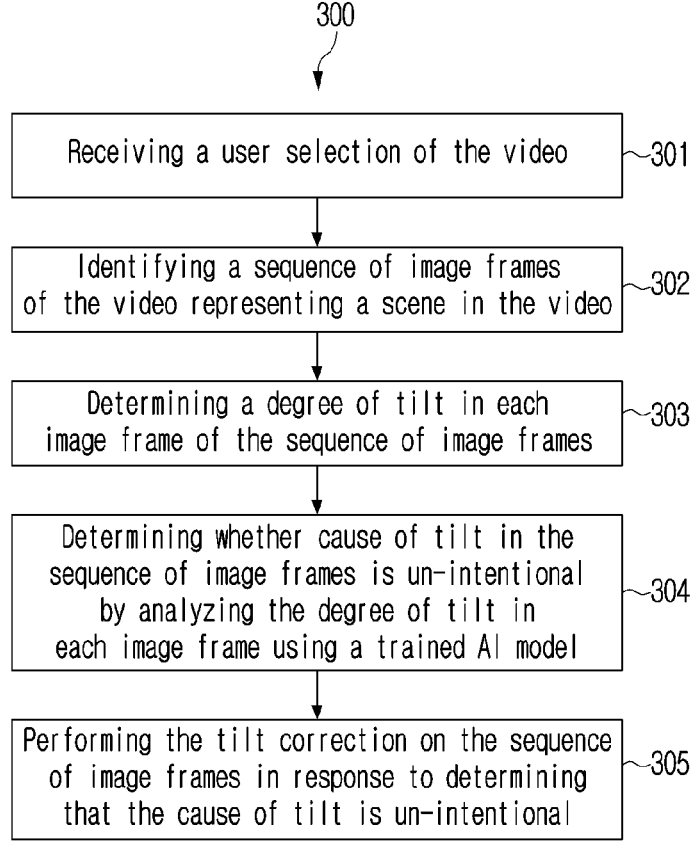

*300*

Receiving a user selection of the video ~301

Identifying a sequence of image frames of the video representing a scene in the video ~302

Determining a degree of tilt in each image frame of the sequence of image frames ~303

Determining whether cause of tilt in the sequence of image frames is un-intentional by analyzing the degree of tilt in each image frame using a trained AI model ~304

Performing the tilt correction on the sequence of image frames in response to determining that the cause of tilt is un-intentional ~305

METHOD AND ELECTRONIC DEVICE FOR TILT CORRECTION OF VIDEO

CROSS REFERENCE TO RELATED APPLICATION

This application is a continuation of International Application PCT/KR2023/006462, filed May 12, 2023, which is based on and claims priority on IN Patent Application No. 202241030409, filed on May 27, 2022, the disclosures of which are all hereby incorporated herein by reference in their entireties.

BACKGROUND

Field

Certain example embodiments relate to an electronic device, and for example to a method and/or the electronic device for tilt correction of a video.

Description of Related Art

Users purposefully or inadvertently change an orientation of a camera away from a reference plane (e.g. horizontal plane) while capturing images/videos, which causes tilt in the images/videos. One goal of purposely creating the tilt (e.g. intentional tilt) in the images/videos is to improve aesthetics of the images/videos. However, the tilt (e.g. unintentional tilt) in the images/videos is attributable to human mistake in utilizing the camera, which is undesirable. Furthermore, the unintentional tilt in the images/videos caused by the human mistakes substantially degrades the aesthetics of the images/videos.

FIGS. 1(A) and 1(B) illustrate the tilt in images. As shown in (11), the image with pitch is confusing to existing heuristics-based methods that poorly detect the tilt in the image by understanding visuals at an object level and due to presence of converging vertical/horizontal lines in the image. Also, the existing methods are not efficient to differentiate the intentional tilt and the unintentional tilt in the images/videos. As shown in (12), the existing heuristics-based methods also miss to understand imaginary horizontal and vertical references and detect the tilt in the image in which orthogonality is a property shared by only a few elements in the image. As shown in (13), objects in foreground of the image hold higher significance to the image. In certain other images, objects in background of the images may hold higher significance to the images. Applying tilt correction by understanding the significant objects in the images is missed in the existing heuristics-based methods.

The user can manually correct the tilt in the image as shown in (15, 16), where (14) is a ground truth image. Manually fixing such tilt in the image is cumbersome and time consuming. Generally, the user manually rotates and/or crops an image frame to correct the tilt in image frame, which causes data loss from the image frame as shown in (16). Alternatively, the user can only manually rotate the image frame to correct the tilt in image frame to restrict the data loss. But, black patches (or black padding) formed on four corners of the image frame due to rotating the image frame as shown in (15). Consider, the tilt in each image frame of a video will be different. Therefore, rotation and/or cropping on the image frames of the video will also be non-uniform while manually correcting the tilt, which results in a zoom in/out jitter in the video that makes a jerky viewing experience to the user and degrades the aesthetics of the video. Thus, it is desired to provide a useful solution for correcting the unintentional tilt in the images/videos.

SUMMARY

Certain example embodiments provide a method and/or an electronic device for tilt correction of a video. The electronic device may bring a tilt angle as close as possible to 0° for every scene span without creating a zoom in/out jitter in the video during the tilt correction, which improves video aesthetics.

Certain example embodiments may perform tilt correction by considering relative spatial positioning of objects, relevance of the objects, and a relative relationship between the objects.

Certain example embodiments may accurately predict the tilt angle in the image frame using a self-attention model.

Certain example embodiments may minimize or reduce pixel and data loss, keep a uniform resolution of image frames and keep smooth transitioning between image frames after the tilt correction by applying out-painting on black patches formed during the tilt correction and taking a center crop of the image frames.

Accordingly, certain example embodiments herein may provide a method for tilt correction of a video by an electronic device. The method may include receiving, by the electronic device, a user selection of the video. The method may include identifying, by the electronic device, a sequence of image frames of the video representing a scene in the video. The method may include determining, by the electronic device, a degree of tilt in each image frame of the sequence of image frames. The method may include determining, by the electronic device, whether a cause of tilt in the sequence of image frames is un-intentional by analyzing the degree of tilt in each image frame using a trained Artificial Intelligence (AI) model. The method may include performing, by the electronic device, the tilt correction on the sequence of image frames based on the cause of tilt being un-intentional.

In an example embodiment, determining, by the electronic device, whether the cause of tilt in the sequence of image frames is un-intentional by analyzing the degree of tilt in each image frame using a trained AI model, may comprise determining, by the electronic device, whether the degree of tilt in each image frame meets (e.g., or 'corresponds to' or 'fit' or 'satisfy') a threshold condition using the trained AI model; and determining, by the electronic device, that the cause of tilt in the sequence of image frames is un-intentional based on the degree of tilt in each image frame meeting the threshold condition.

In an example embodiment, performing, by the electronic device, the tilt correction on the sequence of image frames, may comprise estimating, by the electronic device, a tilt angle of each image frame for maximum/large tilt correction at each image frame; determining, by the electronic device, a tilt angle deviation of each image frame, where the tilt angle deviation of an image frame of the sequence of image frames is an absolute value of difference between the tilt angle of the image frame and a mean of the tilt angles of the image frame and an adjacent image frame of the sequence of image frames; estimating, by the electronic device, a pixel shift and loss in each image frame and a region to crop on each image frame based on the tilt angle deviation and the tilt angle; determining, by the electronic device, a target tilt correction required for each image frame based on the pixel shift and loss; applying, by the electronic device, the target tilt correction, and at least one of cropping and out-painting on the determined region of each image frame; stitching, by the electronic device, each tilt corrected image frame to rebuild the scene; and generating, by the electronic device, a video by sequentially joining stitched image frames.

In an example embodiment, estimating, by the electronic device, the tilt angle of each image frame for the maximum/large tilt correction at each image frame, may comprise predicting, by the electronic device, a range of possible tilt angles of each image frame using a trained self-attention model; and determining, by the electronic device, the tilt angle by determining a weighted mean of the predicted tilt angles with a standard deviation of zero or a larger value.

In an example embodiment, a self-attention model may be trained for tilt angle prediction by determining, by the electronic device, a range of possible tilt angles of training image frames based on relative position of objects in the training image frames, relevance of the objects, and relationship between the objects; generating, by the electronic device, training data using the range of possible tilt angles; generating, by the electronic device, an output vector with distributed probability by performing multi-label training on the training data; and training, by the electronic device, the self-attention model with the output vector using a sigmoid activation for tilt angle prediction.

In an example embodiment, estimating, by the electronic device, the pixel shift and loss in each image frame and the region to crop on each image frame based on the tilt angle deviation and the tilt angle, may comprise identifying, by the electronic device, a small (e.g., minimum) tilt angle of the sequence of image frames based on the tilt angle of each image frame; determining, by the electronic device, a mean tilt angle deviation of the sequence of image frames based on the tilt angle deviation of each image frame; determining, by the electronic device, whether the small (e.g., minimum) tilt angle is greater than the mean tilt angle deviation; performing, by the electronic device, at least one of: setting the mean tilt angle deviation to the small (e.g., minimum) tilt angle, and estimating an angle to correct tilt of each image frame, based on the small (e.g., minimum) tilt angle being greater than the mean tilt angle deviation, and estimating the angle to correct tilt of each image frame, based on the small (e.g., minimum) tilt angle being not greater than the mean tilt angle deviation; and determining, by the electronic device, the region to crop on each image frame based on the mean tilt angle deviation, where the target tilt correction is with minimum or reduced pixel shift and loss.

In an example embodiment, estimating the angle to correct tilt of each image frame, may comprise determining, by the electronic device, whether the tilt angle of an image frame of the sequence of image frames is one of equal to zero, smaller than, or equal to the mean tilt angle deviation, and greater than then mean tilt angle deviation; and performing, by the electronic device, at least one of: estimating the angle to correct tilt of the image frame as zero, based on the tilt angle of the image frame being equal to zero, estimating the angle to correct tilt of the image frame as the tilt angle, based on the tilt angle of the image frame being smaller than or equal to the mean tilt angle deviation, and estimating the angle to correct tilt of the image frame as the mean tilt angle deviation, based on the tilt angle of the image frame being greater than the mean tilt angle deviation.

In an example embodiment, estimating, by the electronic device, the pixel shift and loss in each image frame and the region to crop on each image frame based on the tilt angle deviation and the tilt angle, may comprise identifying, by the electronic device, a maximum/large tilt angle of the sequence of image frames based on the tilt angle of each image frame; determining, by the electronic device, the mean tilt angle deviation of the sequence of image frames based on the tilt angle deviation of each image frame; determining, by the electronic device, whether the tilt angle of an image frame of the sequence of image frames is one of equal to zero, and smaller than or equal to the maximum/large tilt angle; performing, by the electronic device, one of: estimating the angle to correct tilt of the image frame as zero, based on the tilt angle of the image frame being equal to zero, and estimating the angle to correct tilt of the image frame as the tilt angle, based on the tilt angle of the image frame being smaller than or equal to the maximum/large tilt angle; and determining, by the electronic device, the region to crop on each image frame based on the mean tilt angle deviation, where the target tilt correction is with maximum/large pixel shift and loss.

In an example embodiment, determining, by the electronic device, the target tilt correction required for each image frame based on the pixel shift and loss, may comprise determining, by the electronic device, whether the maximum/large tilt angle and the mean tilt angle deviation of the sequence of image frames meet a threshold condition based on the pixel shift and loss; and performing, by the electronic device, one of: the target tilt correction with maximum/large pixel shift and loss, based on the maximum/large tilt angle and the mean tilt angle deviation of the sequence of image frames meeting the threshold condition, and the target tilt correction with minimum or reduced pixel shift and loss, based on the maximum/large tilt angle and the mean tilt angle deviation of the sequence of image frames not meeting the threshold condition.

In an example embodiment, applying, by the electronic device, the target tilt correction and cropping to each image frame on the determined region of each image frame, may comprise rotating, by the electronic device, each image frame based on an estimated angle to correct tilt of the image frame, and cropping, by the electronic device, the determined region on each image frame based on the mean tilt angle deviation.

In an example embodiment, applying, by the electronic device, at least one of cropping and out-painting on the determined region of each image frame, may comprise determining, by the electronic device, whether a region to crop on each image frame meets a threshold condition; and performing, by the electronic device, at least one of: cropping the sequence of image frames, based on the region to crop on each image not meeting the threshold condition, and cropping and out-painting the sequence of image frames, based on the region to crop on each image meeting the threshold condition.

Accordingly, certain example embodiments may provide the electronic device for tilt correction of the video. The electronic device may include a tilt correction controller, a memory, a processor, where the tilt correction controller may be coupled, directly or indirectly, to the memory and the processor. The tilt correction controller may be configured for receiving the user selection of the video. The tilt correction controller may be configured for identifying the sequence of image frames of the video representing the scene in the video. The tilt correction controller may be configured for determining the degree of tilt in each image frame of the sequence of image frames. The tilt correction controller may be configured for determining whether a cause of tilt in the sequence of image frames is un-intentional by analyzing the degree of tilt in each image frame using the trained AI model. The tilt correction controller may be configured for performing the tilt correction on the sequence of image frames based on the cause of tilt being un-intentional.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

BRIEF DESCRIPTION OF DRAWINGS

Example method and/or electronic device are illustrated in the accompanying drawings, throughout which like reference letters indicate corresponding parts in the various figures. Example embodiments herein will be better understood from the following description with reference to the drawings, in which:

FIG. 3 is a flow diagram illustrating a method for tilt correction of the video, according to an example embodiment;

DETAILED DESCRIPTION

Figure 1A:
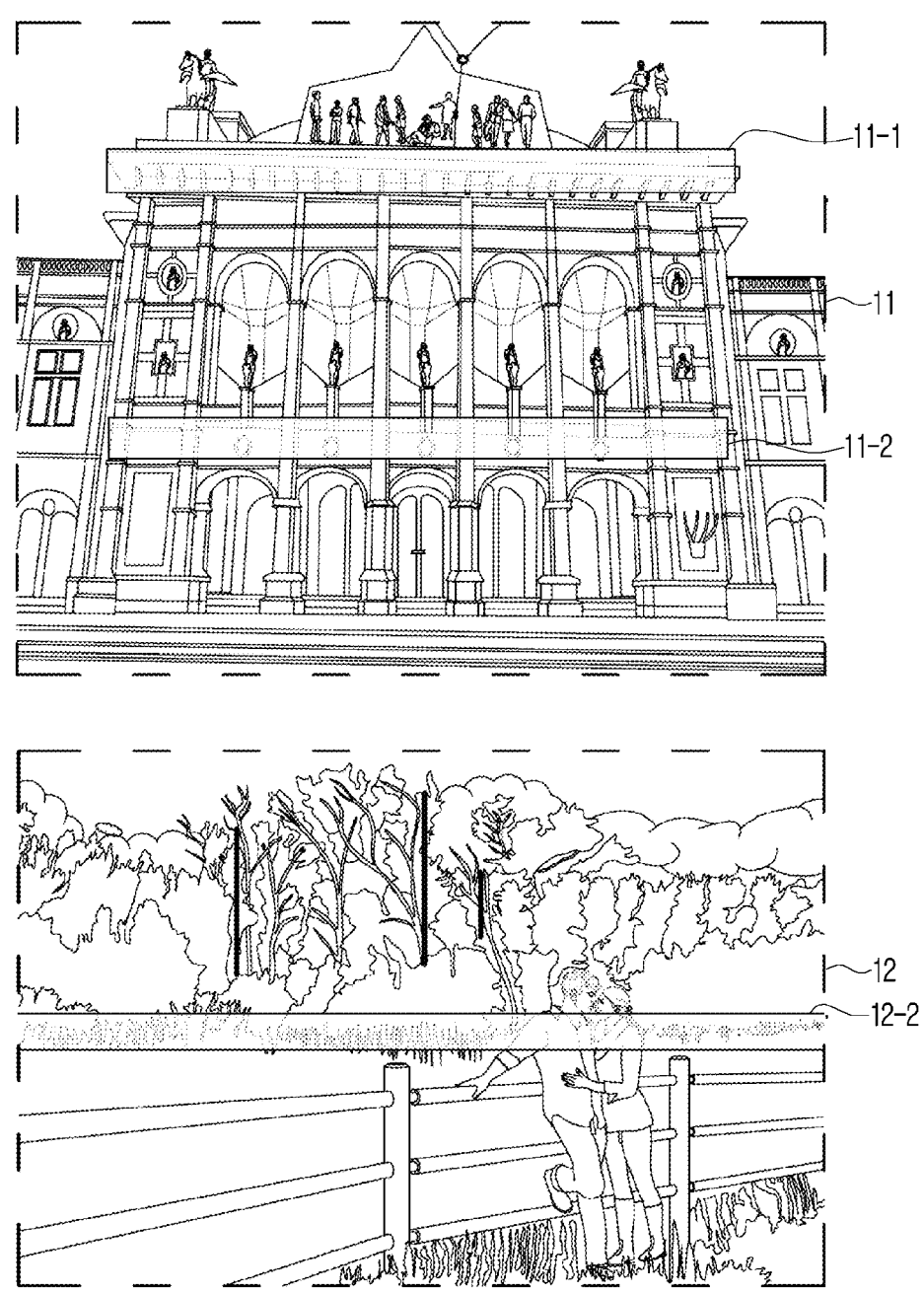
FIGS. 1A and 1B illustrate a tilt in images, according to prior arts.
Figure 1B:
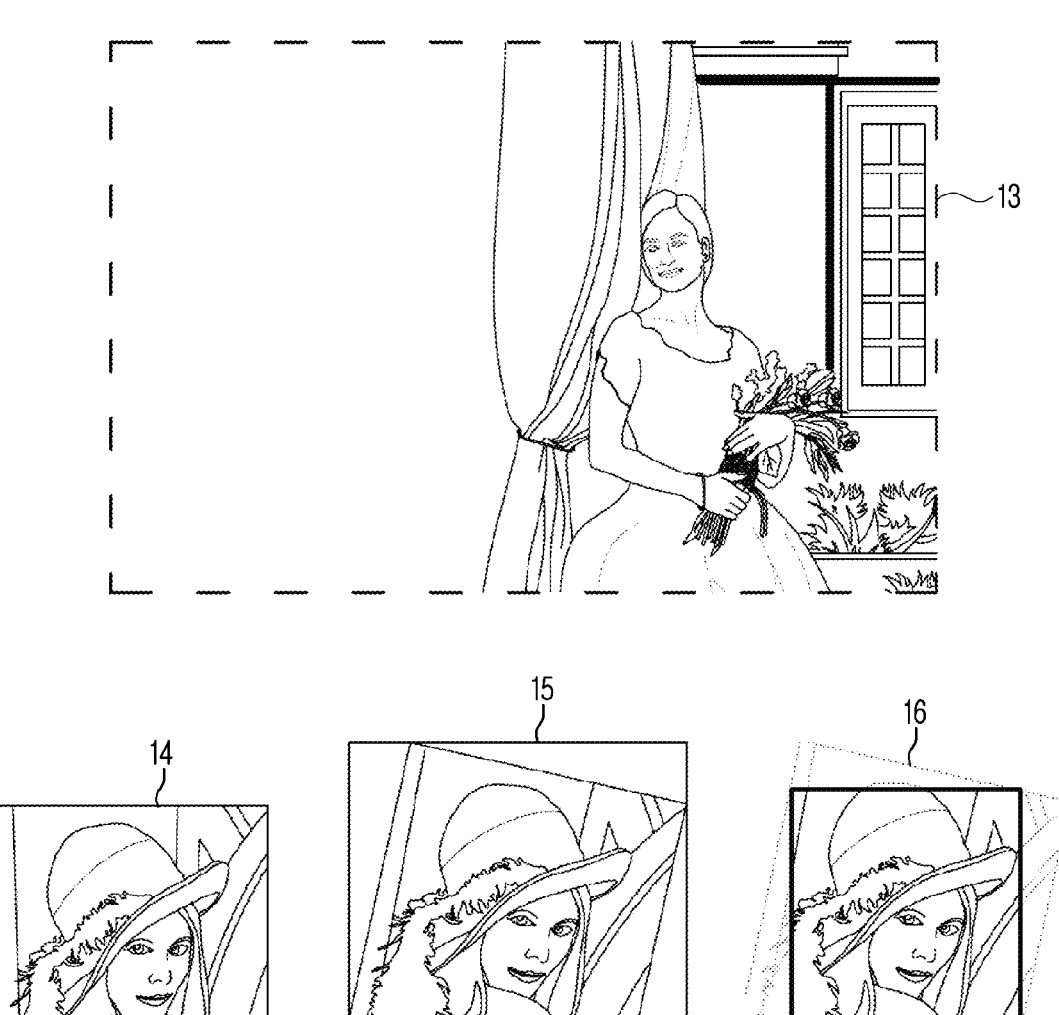

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "image frame" and "image" are used interchangeably and mean the same.

Accordingly, the embodiments herein provide a method for tilt correction of a video by an electronic device. The method includes receiving, by the electronic device, a user selection of the video. The method includes identifying, by the electronic device, a sequence of image frames of the video representing a scene in the video. The method includes determining, by the electronic device, a degree of tilt in each image frame of the sequence of image frames. The method includes determining, by the electronic device, whether cause of tilt in the sequence of image frames is un-intentional by analyzing the degree of tilt in each image frame using a trained Artificial Intelligence (AI) model. The method includes performing, by the electronic device, the tilt correction on the sequence of image frames in response to determining that the cause of tilt is un-intentional.

Accordingly, the embodiments herein provide the electronic device for tilt correction of the video. The electronic device includes a tilt correction controller, a memory, a processor, where the tilt correction controller is coupled, directly or indirectly, to the memory and the processor. The tilt correction controller is configured for receiving the user selection of the video. The tilt correction controller is configured for identifying the sequence of image frames of the video representing the scene in the video. The tilt correction controller is configured for determining the degree of tilt in each image frame of the sequence of image frames. The tilt correction controller is configured for determining whether cause of tilt in the sequence of image frames is un-intentional by analyzing the degree of tilt in each image frame using the trained AI model. The tilt correction controller is configured for performing the tilt correction on the sequence of image frames in response to determining that the cause of tilt is un-intentional.

Unlike existing methods and systems, the electronic device brings a tilt angle as close as possible to 0° for every scene span without creating a zoom in/out jitter in the video during the tilt correction, which improves video aesthetics.

Unlike existing methods and systems, the electronic device minimizes or reduces pixel and data loss, keeps a uniform resolution of the image frames, and keeps smooth transitioning between the image frames after the tilt correction by applying out-painting on black patches formed during the tilt correction and taking a center crop of the image frames.

Referring now to the drawings, and more particularly to FIGS. 2A through 15, there are shown preferred embodiments.

Figure 2A:
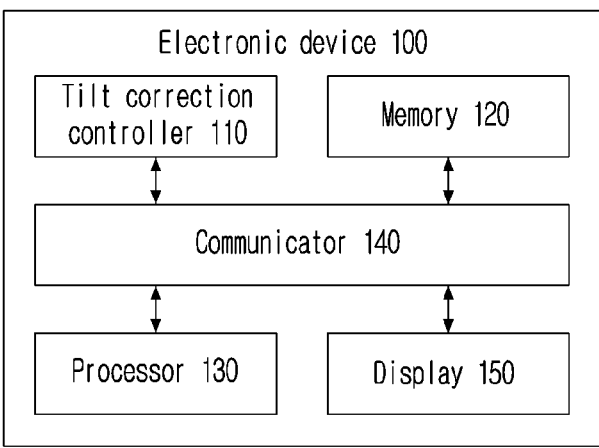
FIG. 2A is a block diagram of an electronic device for tilt correction of a video, according to an example embodiment.

FIG. 2A is a block diagram of an electronic device (100) for tilt correction of a video, according to an embodiment as disclosed herein. Examples of the electronic device (100) include, but are not limited to a smartphone, a tablet computer, a Personal Digital Assistance (PDA), a desktop computer, an Internet of Things (IoT), a wearable device, etc. In an embodiment, the electronic device (100) includes a tilt correction controller (110), a memory (120), a processor (130), a communicator (140), and a display (150), where the display is a physical hardware component that can be used to display the video to a user. Examples of the main display include, but are not limited to a light emitting diode display, a liquid crystal display, a projector, etc. The tilt correction controller (110) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The tilt correction controller (110) receives a user selection of the video. In an embodiment, the display (150) displays the video. Further, a user can select a region of the displayed video. Further, the tilt correction controller (110) determines the selected region on the displayed video as the user selection of the video.

Further, the tilt correction controller (110) identifies a sequence of image frames of the video representing a scene in the video. In an embodiment, the tilt correction controller (110) extracts the image frames of the video and identifies the image frames in sequence with a similar scene. Further, the tilt correction controller (110) groups the image frames in sequence with the similar scene to a scene span. The tilt correction controller (110) determines a degree of tilt in each image frame of the scene span or the sequence of image frames.

Figure 2B:
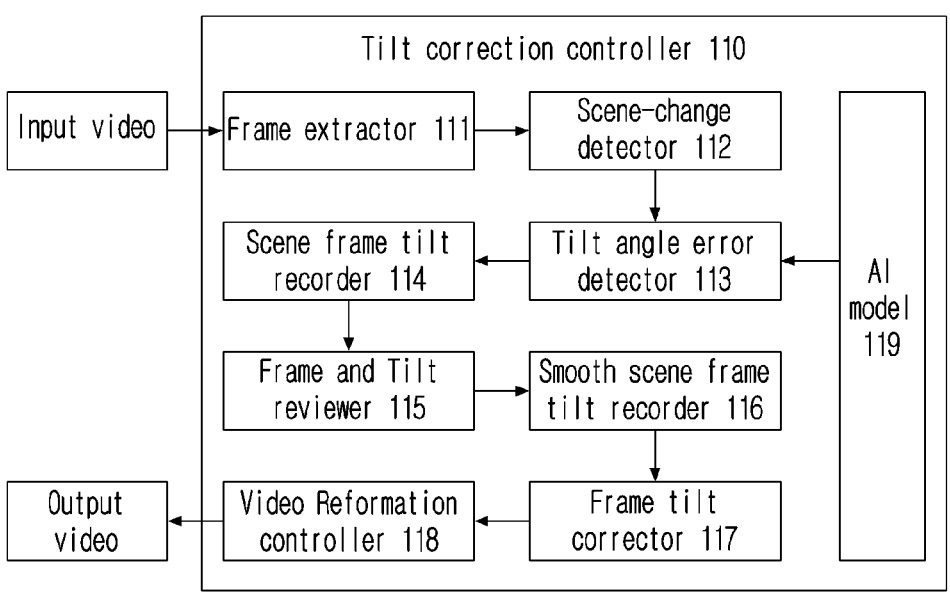
FIG. 2B is a block diagram of a tilt correction controller for tilt correction of the video contains image frames with un-intentional tilt, according to an example embodiment.

The tilt correction controller (110) determines whether cause of tilt in the scene span or the sequence of image frames is un-intentional by analyzing the degree of tilt in each image frame using a trained Artificial Intelligence (AI) model (e.g., 119 in FIG. 2B). In an embodiment, the tilt correction controller (110) determines whether the degree of tilt in each image frame meets a first threshold condition using the trained AI model (119). Further, the tilt correction controller (110) determines that the cause of tilt in the sequence of image frames is un-intentional in response to determining that the degree of tilt in each image frame meets the threshold condition.

The tilt correction controller (110) performs the tilt correction on the sequence of image frames in response to determining that the cause of tilt is un-intentional. In an embodiment, the tilt correction controller (110) estimates a tilt angle (also expressed as α) of each image frame for large (e.g., maximum) tilt correction at each image frame. Further, the tilt correction controller (110) determines a tilt angle deviation (also expressed as δ) of each image frame, where the tilt angle deviation of the image frame of the sequence of image frames is an absolute value of difference between the tilt angle of the image frame and a mean of the tilt angles of the image frame and an adjacent image frame of the sequence of image frames. Further, the tilt correction controller (110) estimates a pixel shift and loss in each image frame and a region to crop on each image frame based on the tilt angle deviation and the tilt angle. Further, the tilt correction controller (110) determines a target tilt correction required for each image frame based on the pixel shift and loss. Further, the tilt correction controller (110) applies the target tilt correction and cropping and/or out-painting on the determined region of each image frame. Further, the tilt correction controller (110) stitches each tilt corrected image frame to rebuild the scene. Further, the tilt correction controller (110) generates a video by sequentially joining stitched image frames.

In an embodiment, for estimating the tilt angle of each image frame for the maximum tilt correction at each image frame, the tilt correction controller (110) predicts a range of possible tilt angles of each image frame using a trained self-attention model. Further, the tilt correction controller (110) determines the tilt angle by determining a weighted mean of the predicted tilt angles with a standard deviation of zero or a larger value. In an embodiment, the tilt correction controller (110) determines a range of possible tilt angles of training image frames based on relative position of objects in the training image frames, relevance of the objects, and relationship between the objects for training a self-attention model. Further, the tilt correction controller (110) generates training data using the range of possible tilt angles. Further, the tilt correction controller (110) generates an output vector with distributed probability by performing multi-label training on the training data. Further, the tilt correction controller (110) trains the self-attention model with the output vector using a sigmoid activation for tilt angle prediction.

In an embodiment, for estimating the pixel shift and loss in each image frame and the region to crop on each image frame based on the tilt angle deviation and the tilt angle, the tilt correction controller (110) identifies a small (e.g., minimum) tilt angle of the sequence of image frames based on the tilt angle of each image frame. Further, the tilt correction controller (110) determines a mean tilt angle deviation of the sequence of image frames based on the tilt angle deviation of each image frame. Further, the tilt correction controller (110) determines whether the small (e.g., minimum) tilt angle is greater than the mean tilt angle deviation. The tilt correction controller (110) sets the mean tilt angle deviation to the small (e.g., minimum) tilt angle and estimates an angle to correct tilt of each image frame, in response to determining that the small (e.g., minimum) tilt angle is greater than the mean tilt angle deviation. The tilt correction controller (110) estimates the angle to correct the tilt of each image frame, in response to determining that the small (e.g., minimum) tilt angle is not greater than the mean tilt angle deviation. Further, the tilt correction controller (110) determines the region to crop on each image frame based on the mean tilt angle deviation, where the target tilt correction is with minimum or reduced pixel shift and loss.

In an embodiment, for estimating the angle to correct tilt of each image frame, the tilt correction controller (110) determines whether the tilt angle of an image frame of the sequence of image frames is equal to zero, or smaller than the mean tilt angle deviation or equal to the mean tilt angle deviation, or greater than the mean tilt angle deviation. The tilt correction controller (110) estimates the angle to correct the tilt of the image frame as zero, in response to determining that the tilt angle of the image frame is equal to zero. The tilt correction controller (110) estimates the angle to correct the tilt of the image frame as the tilt angle, in response to determining that the tilt angle of the image frame is smaller than or equal to the mean tilt angle deviation. The tilt correction controller (110) estimates the angle to correct the tilt of the image frame as the mean tilt angle deviation, in response to determining that the tilt angle of the image frame is greater than the mean tilt angle deviation.

In another embodiment, for estimating the pixel shift and loss in each image frame and the region to crop on each image frame based on the tilt angle deviation and the tilt angle, the tilt correction controller (110) identifies a maximum tilt angle of the sequence of image frames based on the tilt angle of each image frame. Further, the tilt correction controller (110) determines the mean tilt angle deviation of the sequence of image frames based on the tilt angle deviation of each image frame. Further, the tilt correction controller (110) determines whether the tilt angle of the image frame of the sequence of image frames is equal to zero, or smaller than the maximum tilt angle or equal to the maximum tilt angle. The tilt correction controller (110) estimates the angle to correct the tilt of the image frame as zero, in response to determining that the tilt angle of the image frame is equal to zero. The tilt correction controller (110) estimates the angle to correct the tilt of the image frame as the tilt angle, in response to determining that the tilt angle of the image frame is smaller than the maximum tilt angle or equal to the maximum tilt angle. Further, the tilt correction controller (110) determines the region to crop on each image frame based on the mean tilt angle deviation, where the target tilt correction is with maximum pixel shift and loss.

In an embodiment, for determining the target tilt correction required for each image frame based on the pixel shift and loss, the tilt correction controller (110) determines whether the maximum tilt angle and the mean tilt angle deviation of the sequence of image frames meet a second threshold condition based on the pixel shift and loss. The tilt correction controller (110) performs the target tilt correction with maximum pixel shift and loss, in response to determining that the maximum tilt angle and the mean tilt angle deviation of the sequence of image frames meet the second threshold condition. The tilt correction controller (110) performs the target tilt correction with minimum or reduced pixel shift and loss, in response to determining that the maximum tilt angle and the mean tilt angle deviation of the sequence of image frames do not meet the second threshold condition.

In an embodiment, for applying the target tilt correction and cropping to each image frame on the determined region of each image frame, the tilt correction controller (110), comprising processing circuitry, rotates each image frame based on the estimated angle to correct the tilt of the image frame. Further, the tilt correction controller (110) crops the determined region on each image frame based on the mean tilt angle deviation.

In an embodiment, for applying cropping and/or outpainting on the determined region of each image frame, the tilt correction controller (110) determines whether the region to crop on each image frame meets a third threshold condition. The tilt correction controller (110) crops the sequence of image frames, in response to determining that the region to crop on each image does not meet the threshold condition. Further, the tilt correction controller (110) crops and outpaints the sequence of image frames, in response to determining that the region to crop on each image meets the threshold condition.

The memory (120) stores the video, the image frames are processed at intermediate stages of the tilt correction of the video. The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the electronic device (100), a cloud storage, or any other type of external storage.

The processor (130) is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) is configured for communicating internally between hardware components in the electronic device (100). Further, the communicator (140)

is configured to facilitate the communication between the electronic device (100) and other devices via one or more networks (e.g. Radio technology). The communicator (140) includes an electronic circuit specific to a standard that enables wired or wireless communication.

Although the FIG. 2A shows the hardware components of the electronic device (100) but it is to be understood that other embodiments are not limited thereon. In other embodiments, the electronic device (100) may include less or a greater number of components. Further, the labels or names of the components are used only for illustrative purpose and does not limit the scope. One or more components can be combined to perform same or substantially similar function for tilt correction of the video.

FIG. 2B is a block diagram of the tilt correction controller (110) for tilt correction of the video containing the image frames with an un-intentional tilt, according to an embodiment as disclosed herein. In an embodiment, the tilt correction controller (110) includes a frame extractor (111), a scene-change detector (112), a tilt angle error detector (113), a scene frame tilt recorder (114), a frame and tilt reviewer (115), a smooth scene frame tilt recorder (116), a frame tilt corrector (117), a video reformation controller (118), and the AI model (119). The frame extractor (111), the scene-change detector (112), the tilt angle error detector (113), the scene frame tilt recorder (114), the frame and tilt reviewer (115), the smooth scene frame tilt recorder (116), the frame tilt corrector (117), and the video reformation controller (118) are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

At least one of a plurality of modules of the tilt correction controller (110) may be implemented through the AI model (119). A function associated with the AI model (119) may be performed through the non-volatile/volatile memory (120), and the processor (130). The one or a plurality of processors (130) controls the processing of the input data in accordance with a predefined operating rule or the AI model (119) stored in the non-volatile/volatile memory (120). The predefined operating rule or the AI model (119) is provided through training or learning. Here, being provided through learning means that, by applying a learning method to a plurality of learning data, the predefined operating rule or the AI model (119) of a desired characteristic is made. The learning may be performed in the electronic device (100) itself in which the AI model (119) according to an embodiment is performed, and/or may be implemented through a separate server/system. Each "model" and each "module" herein may comprise circuitry, such as processing circuitry.

The AI model (119) may be of or include a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks. The learning method is a method for training a predetermined target device (for example, a robot) using a plurality of learning data to cause, allow, or control the target device to make a determination or prediction. Examples of the learning method include, but are not limited to, supervised learning, unsupervised learning, semi-supervised learning, or reinforcement learning.

The frame extractor (111) receives the video and the user selection on the video. The frame extractor (111) extracts image frames of the video. The scene-change detector (112) receives extracted image frames with a timestamp and predicts the tilt angle in the image frames. The scene-change detector (112) detects the video scenes using temporal and spatial features and identifies the image frames in sequence with similar scenes. Temporal features imply time-based features. For example, a scene is defined by a certain time span in the video. Spatial features imply the content in image frames of the video. For example, a scene depicting a character doing a certain action. The scene-change detector (112) provides a range of frame Identifiers (IDs) pertaining to similar scenes and groups the frame IDs under the scene span.

Tilt angle error detector (113) receives the Red Green Blue (RGB) frame buffer with a dimension (e.g. length and/or width). Tilt angle error detector (113) executes deep learning model operations using trained weights to detect un-intentional tilt angle error in the range of 0 to 360 degrees. The tilt angle error detector (113) generates 360 class label probabilities for the image frame. The tilt angle error detector (113) determines the image frame is tilted by the predicted angle class label if a value of that class label is detected to be above a threshold value.

The tilt angle error detector (113) determines the degree of tilt in each image frame of the scene span or the sequence of image frames. The tilt angle error detector (113) determines whether the cause of tilt in the scene span or the sequence of image frames is un-intentional by analyzing the degree of tilt in each image frame using the trained AI model (119). In an embodiment, the tilt angle error detector (113) determines whether the degree of tilt in each image frame meets the first threshold condition (e.g. a value of the class label is detected to be above the threshold value) using the trained AI model (119). Further, the tilt angle error detector (113) determines that the cause of tilt in the sequence of image frames is un-intentional in response to determining that the degree of tilt in each image frame meets the threshold condition.

The tilt angle error detector (113) estimates the tilt angle of each image frame for (e.g., maximum) tilt correction at each image frame. Further, the tilt angle error detector (113) determines the tilt angle deviation of each image frame. In an embodiment, for estimating the tilt angle of each image frame for the maximum/large tilt correction at each image frame, the tilt angle error detector (113) predicts the range of possible tilt angles of each image frame using the trained self-attention model. Further, the tilt angle error detector (113) determines the tilt angle by determining the weighted mean of the predicted tilt angles with the standard deviation of zero or the larger value. In an embodiment, the tilt angle error detector (113) determines the range of possible tilt angles of training image frames based on the relative position of objects in the training image frames, the relevance of the objects, and the relationship between the objects for training the self-attention model. Further, the tilt angle error detector (113) generates the training data using the range of possible tilt angles. Further, the tilt correction controller (110) generates the output vector with distributed probability by performing multi-label training on the training data. Further, the tilt angle error detector (113) trains the self-attention model with the output vector using the sigmoid activation for tilt angle prediction.

The frame and tilt reviewer (115) receives the tilt angle $\alpha=[\alpha_1, \alpha_2, \ldots \alpha_n]$ and the tilt angle deviation $\delta=[\delta_1, \delta_2, \delta_3, \ldots \delta_n,]$ of the image frames in the scene span. The frame and tilt reviewer (115) determines a suitable tilt correction method to give input scene information and calculate the target tilt angles for each frame under observation. Further, the frame and tilt reviewer (115) provides target tilt angles for each frame under observation The frame and tilt reviewer (115) estimates the pixel shift and loss in each image frame and the region to crop on each image frame based on the tilt angle deviation and the tilt angle. Further, the frame and tilt reviewer (115) determines the target tilt correction required for each image frame based on the pixel shift and loss. In an embodiment, the frame and tilt reviewer (115) identifies the minimum tilt angle of the sequence of image frames based on the tilt angle of each image frame. Further, the frame and tilt reviewer (115) determines the mean tilt angle deviation of the sequence of image frames based on the tilt angle deviation of each image frame. Further, the frame and tilt reviewer (115) determines whether the minimum tilt angle is greater than the mean tilt angle deviation. The frame and tilt reviewer (115) sets the mean tilt angle deviation to the minimum tilt angle, and estimates the angle to correct tilt of each image frame, in response to determining that the minimum tilt angle is greater than the mean tilt angle deviation. Frame and tilt reviewer (115) estimates the angle to correct tilt of each image frame, in response to determining that the minimum tilt angle is not greater than the mean tilt angle deviation. Further, the frame and tilt reviewer (115) determines the region to crop on each image frame based on the mean tilt angle deviation, where the target tilt correction is with minimum pixel shift and loss.

In an embodiment, the frame and tilt reviewer (115) determines whether the tilt angle of an image frame of the sequence of image frames is equal to zero, or smaller than the mean tilt angle deviation or equal to the mean tilt angle deviation, or greater than the mean tilt angle deviation. The frame and tilt reviewer (115) estimates the angle to correct the tilt of the image frame as zero, in response to determining that the tilt angle of the image frame is equal to zero. The frame and tilt reviewer (115) estimates the angle to correct tilt of the image frame as the tilt angle, in response to determining that the tilt angle of the image frame is smaller than or equal to the mean tilt angle deviation. The frame and tilt reviewer (115) estimates the angle to correct tilt of the image frame as the mean tilt angle deviation, in response to determining that the tilt angle of the image frame is greater than the mean tilt angle deviation.

In another embodiment, the frame and tilt reviewer (115) identifies the maximum tilt angle of the sequence of image frames based on the tilt angle of each image frame. Further, the frame and tilt reviewer (115) determines the mean tilt angle deviation of the sequence of image frames based on the tilt angle deviation of each image frame. Further, the frame and tilt reviewer (115) determines whether the tilt angle of the image frame of the sequence of image frames is equal to zero, or smaller than the maximum tilt angle or equal to the maximum tilt angle. The frame and tilt reviewer (115) estimates the angle to correct the tilt of the image frame as zero, in response to determining that the tilt angle of the image frame is equal to zero. The frame and tilt reviewer (115) estimates the angle to correct tilt of the image frame as the tilt angle, in response to determining that the tilt angle of the image frame is smaller than the maximum tilt angle or equal to the maximum tilt angle. Further, the frame and tilt reviewer (115) determines the region to crop on each image frame based on the mean tilt angle deviation, where the target tilt correction is maximum in which the pixel shift and loss is also maximum.

In an embodiment, the frame and tilt reviewer (115) determines whether the maximum tilt angle and the mean tilt angle deviation of the sequence of image frames meet the second threshold condition based on the pixel shift and loss. The frame and tilt reviewer (115) performs the target tilt correction with maximum pixel shift and loss, in response to determining that the maximum tilt angle and the mean tilt angle deviation of the sequence of image frames meet the second threshold condition. The frame and tilt reviewer (115) performs the target tilt correction with minimum pixel shift and loss, in response to determining that the maximum tilt angle and the mean tilt angle deviation of the sequence of image frames do not meet the second threshold condition.

The frame tilt corrector (117) performs the tilt correction on the sequence of image frames in response to determining that the cause of tilt is un-intentional. The frame tilt corrector (117) uses the extracted RGB frame buffers and applies target tilt correction and performs cropping or/and out-painting on the determined region of each image frame to generate the tilt corrected image frame. In an embodiment, the frame tilt corrector (117) rotates each image frame based on the estimated angle to correct tilt of the image frame. Further, the frame tilt corrector (117) crops the determined region on each image frame based on the mean tilt angle deviation. In another embodiment, the frame tilt corrector (117) determines whether the region to crop on each image frame meets the third threshold condition. The frame tilt corrector (117) crops the sequence of image frames, in response to determining that the region to crop on each image does not meet the threshold condition. Further, the frame tilt corrector (117) crops and out-paints the sequence of image frames, in response to determining that the region to crop on each image meets the threshold condition.

The video reformation controller (118) receives extracted and corrected RGB frame buffers and stitches the corrected and non-corrected image frames to rebuild the video with corrected video frames inserted in place of the tilted frames on the video, where the video is regenerated by sequentially joining the stitched image frames.

Although the FIG. 2B shows the hardware components of the tilt correction controller (110) but it is to be understood that other embodiments are not limited thereon. In other embodiments, the tilt correction controller (110) may include less or a greater number of components. Further, the labels or names of the components are used only for illustrative purpose and does not limit the scope. One or more components can be combined to perform same or substantially similar function for tilt correction of the video contains the image frames with un-intentional tilt.

FIG. 3 is a flow diagram (300) illustrating a method for tilt correction of the video, according to an embodiment as disclosed herein. In an embodiment, the method allows the tilt correction controller (110) to perform steps 301-305 of the flow diagram (300). At step 301, the method includes receiving the user selection of the video. At step 302, the method includes identifying the sequence of image frames of the video representing the scene in the video. At step 303, the method includes determining the degree of tilt in each image frame of the sequence of image frames. At step 304, the method includes determining whether the cause of tilt in the sequence of image frames is un-intentional by analyzing the degree of tilt in each image frame using the trained AI model (119). At step 305, the method includes performing the tilt correction on the sequence of image frames in response to determining that the cause of tilt is un-intentional.

Figure 4:
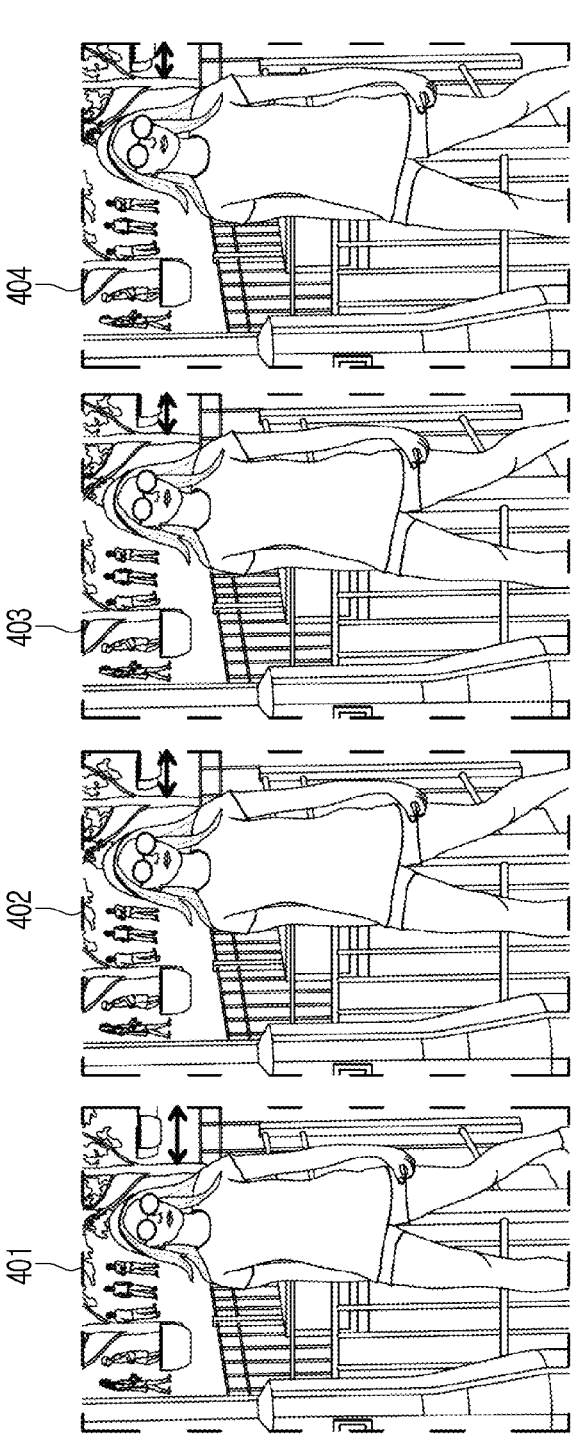
FIG. 4 illustrates a method of determining a tilt angle in an example scenario, according to an example embodiment.

FIG. 4 illustrates an example scenario of determining the tilt angle, according to an embodiment as disclosed herein. In the proposed method, the tilt angle ranges above 15° in a clockwise direction or anticlockwise direction with reference to 0° in a 360-degree scale considers as intentionally creating the tilt in the images/videos, whereas the image ranges above 0° to 15° in the clockwise direction or the anticlockwise direction with reference to 0° in the 360-degree scale considers as unintentionally creating the tilt in the images/videos. The electronic device (100) (e.g. deep tilt detection neural engine) extracts the features of each image frame upon obtaining the image frames of the video. Further, the electronic device (100) predicts the degree of tilt in each image frame using the self-attention model. Further, the electronic device (100) determines the tilt angle (α) of each image frame using equation 1.

$$\alpha = \frac{\sum_{i=1}^{n} w_i X_i}{\sum_{i=1}^{n} w_i} \qquad (1)$$

The variable i represents ith label prediction out of 5 labels, w represents a weight of the predicted value of the ith label, and X represents value of the prediction of the ith label.

Consider, an example scenario in which the electronic device (100) predicts the tilt angle of the image frame (401-404). The electronic device (100) predicts the tilt angle of the image frame (401) as 1° clockwise in 1st iteration, which means a relevant object in the image frame (401) is tilted by 1° clockwise with reference to 0° in the 360-degree scale. In consecutive iterations, the electronic device (100) predicts the tilt angle of the image frame (402) as 2° clockwise, the tilt angle of the image frame (403) as 4° clockwise, and the tilt angle of the image frame (404) as 4° clockwise. After prediction of all tilt angles, the electronic device (100) determines a weighted mean of the predictions as the tilt angle.

Figure 5:
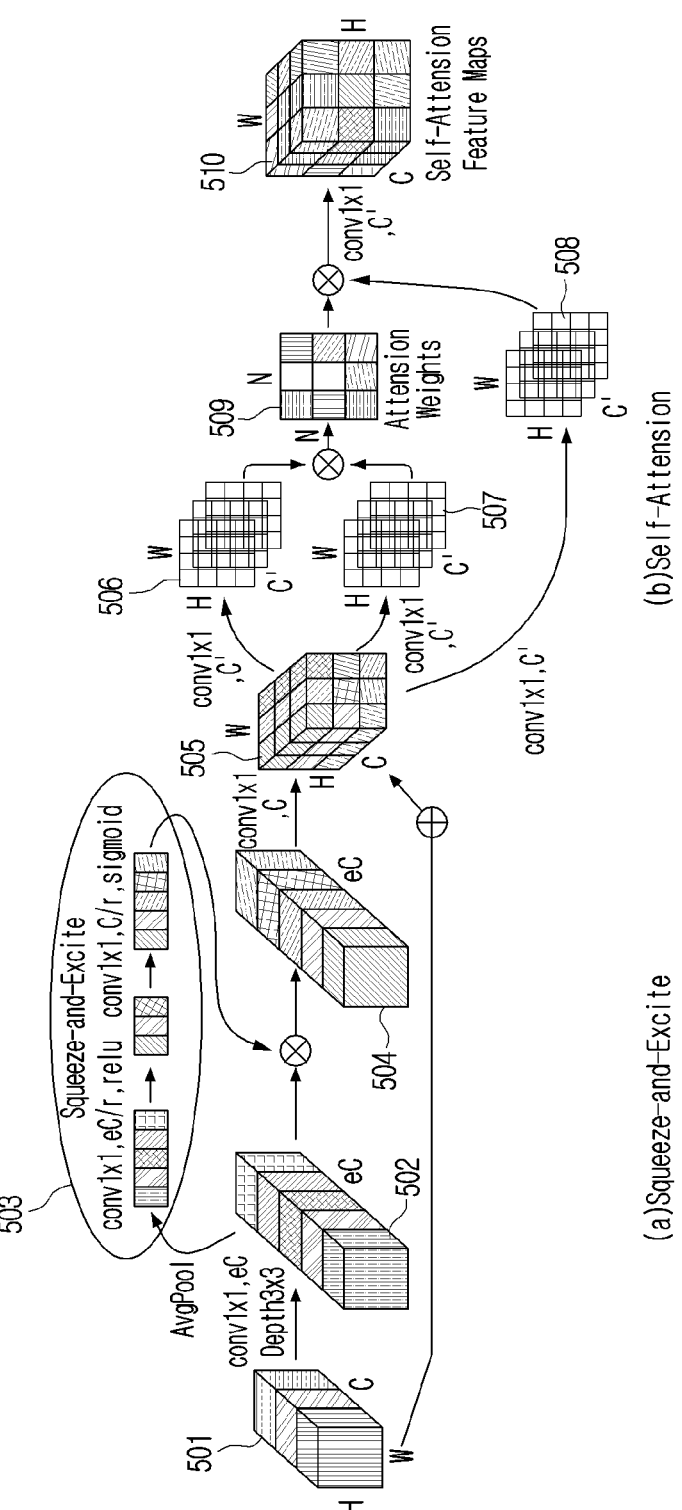
FIG. 5 illustrates a schematic diagram of a self-attention model, according to an example embodiment.

FIG. 5 illustrates a schematic diagram of the self-attention model, according to an embodiment as disclosed herein. Layers, outputs, and dilations of self-attention model are given in table 1.

TABLE 1

| Layer | Outputs | Dilations |
|---|---|---|
| Input | $224^2 \times 3$ | — |
| Convolution block | $112^2 \times 16$ | 1 |
| Inverted Bottleneck Layer_no_expansion | $112^2 \times 16$ | 1 |
| Inverted Bottleneck Layer | $56^2 \times 16$ | 1 |
| Inverted Bottleneck Layer | $[28^2 \times 32] \times 4$ blocks | [1, 1, 1, 1] |
| Inverted Bottleneck Layer | $[14^2 \times 64] \times 4$ blocks | [1, 1, 2, 4] |
| self-attention model block | $[14^2 \times 64] \times 3$ blocks | [1, 2, 4] |
| self-attention model block | $[7^2 \times 96] \times 4$ blocks | [2, 2, 4, 4] |
| Separable convolution layer | num_classes | — |

Figure 6:
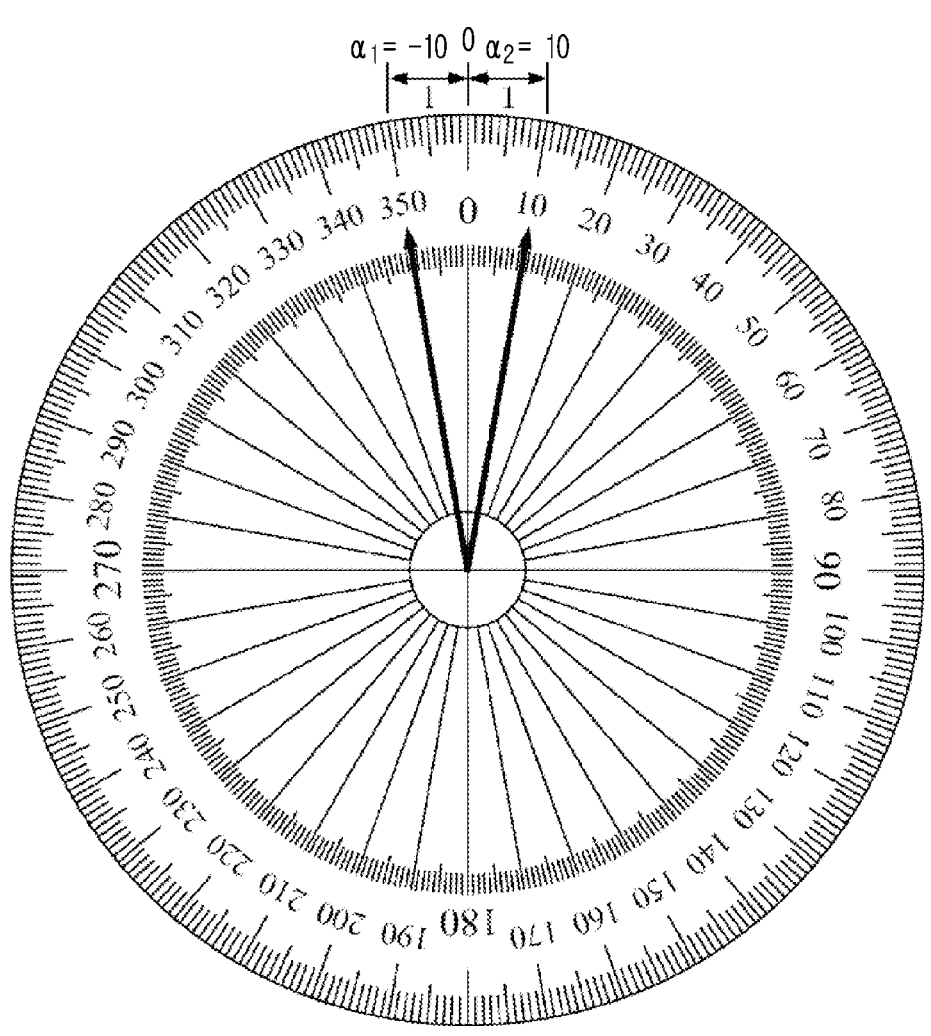
FIG. 6 illustrates the tilt angle of an image frame of the video in a 360-degree scale, according to an example embodiment.

FIG. 6 illustrates the tilt angle of the image frame of the video in the 360-degree scale, according to an embodiment as disclosed herein. The tilt angle (α) of the image frame is measured on a scale of 360 degrees. Even if the tilt angle (α2) is in the clockwise direction or the tilt angle (α1) is in the anticlockwise direction, the tilt angle deviation with respect to 0° in the 360-degree scale is an absolute value. Specifically, the image frame with the clockwise tilt of 10 degrees and the image frame with the anti-clockwise tilt of 10 degrees exhibit the tilt angle deviation of 10 degrees with respect to the 0° in the 360-degree scale which is the absolute value of the tilt angles (+10° or −10°). By determining the tilt angle deviations with respect to 0° implicitly takes care of the tilt angle deviations with respect to the adjacent frames.

Figure 7:
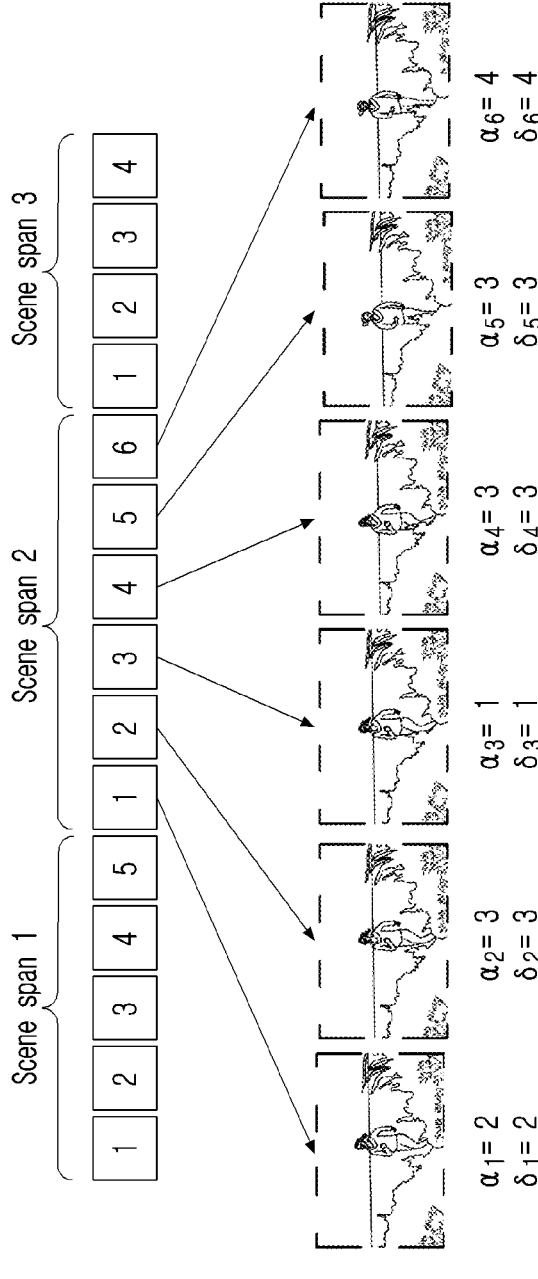
FIG. 7 illustrates scene spans and the image frames in each scene span of the video, according to an example embodiment.

FIG. 7 illustrates the scene spans and the image frames in each scene span of the video, according to an embodiment as disclosed herein. Consider three scene spans of the video, where the scene span 1 includes 5 consecutive image frames, the scene span 2 includes remaining 6 consecutive image frames, and the scene span includes further 4 consecutive image frames, where the number of each image frame in the scene span represents a frame identifier of the corresponding image frame. The 6 consecutive image frames of the scene span 2 is further detailed in the FIG. 7. The tilt angle and the tilt angle deviation of each image frame of the scene span 2 is presented below, one for each image frame.

Figure 8:
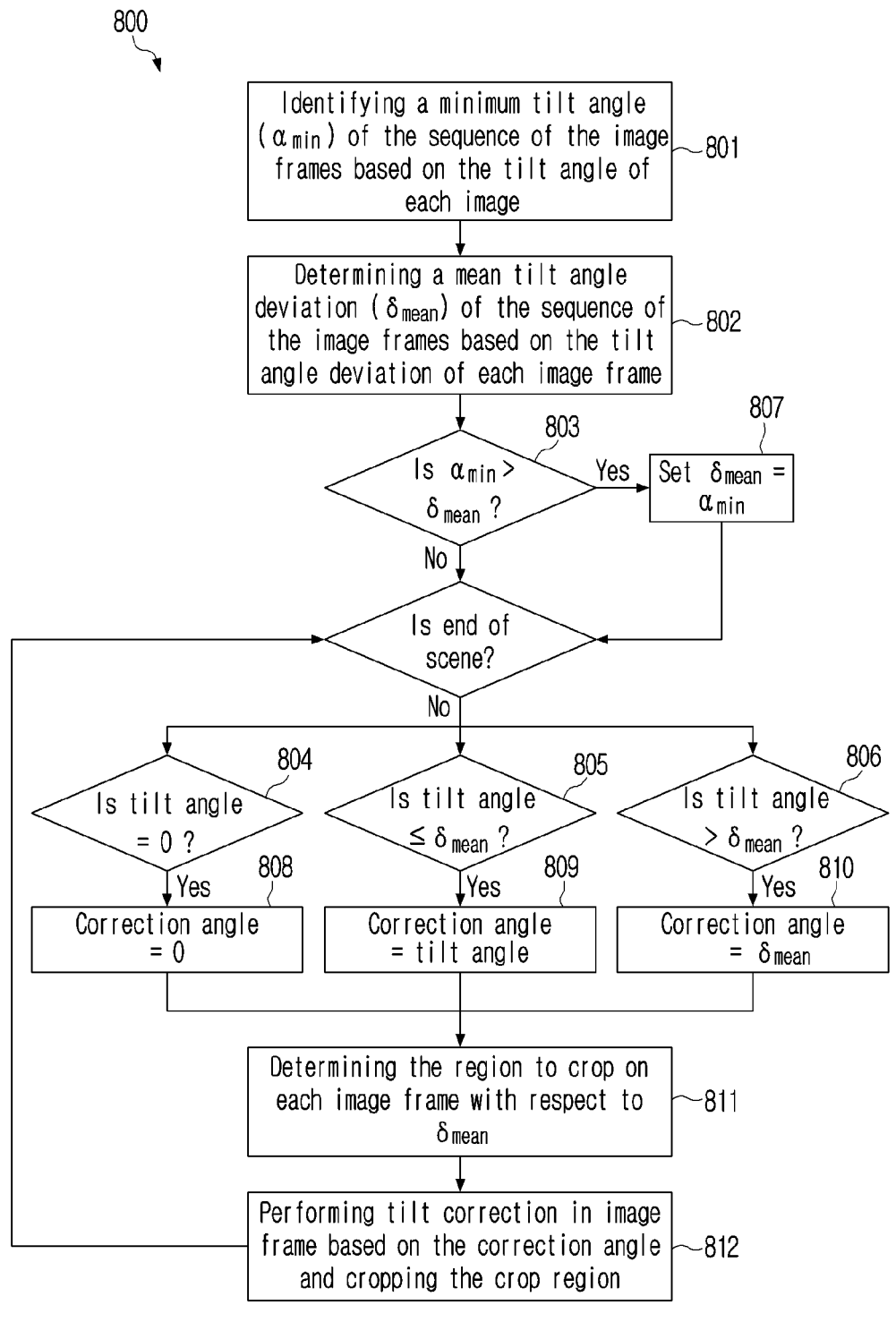
FIG. 8 is a flow diagram illustrating a method for tilt correction with minimum or reduced pixel shift and loss at the image frame, according to an example embodiment.

FIG. 8 is a flow diagram (800) illustrating a method for tilt correction with minimum pixel shift and loss at the image frame, according to an embodiment as disclosed herein. In an embodiment, the method allows the tilt correction controller (110) to perform steps 801-812 of the flow diagram (800). At step 801, the method includes identifying the minimum tilt angle ($\alpha_{min}$) of the sequence of image frames based on the tilt angle of each image frame. At step 802, the method includes determining the mean tilt angle deviation ($\delta_{mean}$) of the sequence of image frames based on the tilt angle deviation of each image frame. At step 803, the method includes determining whether the minimum tilt angle is greater than the mean tilt angle deviation.

When the scene does not end after the step 803, at steps 804-806, the method includes determining whether the tilt angle of the image frame of the sequence of image frames is one of equal to zero, smaller than or equal to mean tilt angle deviation, and greater than then mean tilt angle deviation, in response to determining that the minimum tilt angle is not greater than the mean tilt angle deviation. At step 807, the method includes setting the mean tilt angle deviation to the minimum tilt angle, and flows to steps 804-806 when the scene does not end after the step 807, in response to determining that the minimum tilt angle is greater than the mean tilt angle deviation. At step 808, the method includes estimating the angle to correct tilt of the image frame as zero (e.g. correction angle=0), in response to determining that the tilt angle of the image frame is equal to zero.

At step 809, the method includes estimating the angle to correct tilt of the image frame as the tilt angle (e.g. correction angle=tilt angle), in response to determining that the tilt angle of the image frame is smaller than or equal to the mean tilt angle deviation. At step 810, the method includes estimating the angle to correct tilt of the image frame as the mean tilt angle deviation (e.g. correction angle=$\delta_{mean}$), in response to determining that the tilt angle of the image frame is greater than the mean tilt angle deviation. At step 811, the method includes determining the region to crop on each image frame based on the mean tilt angle deviation. At step 812, the method includes performing tilt correction in the image frame based on the correction angle and cropping the crop region.

Figure 9:
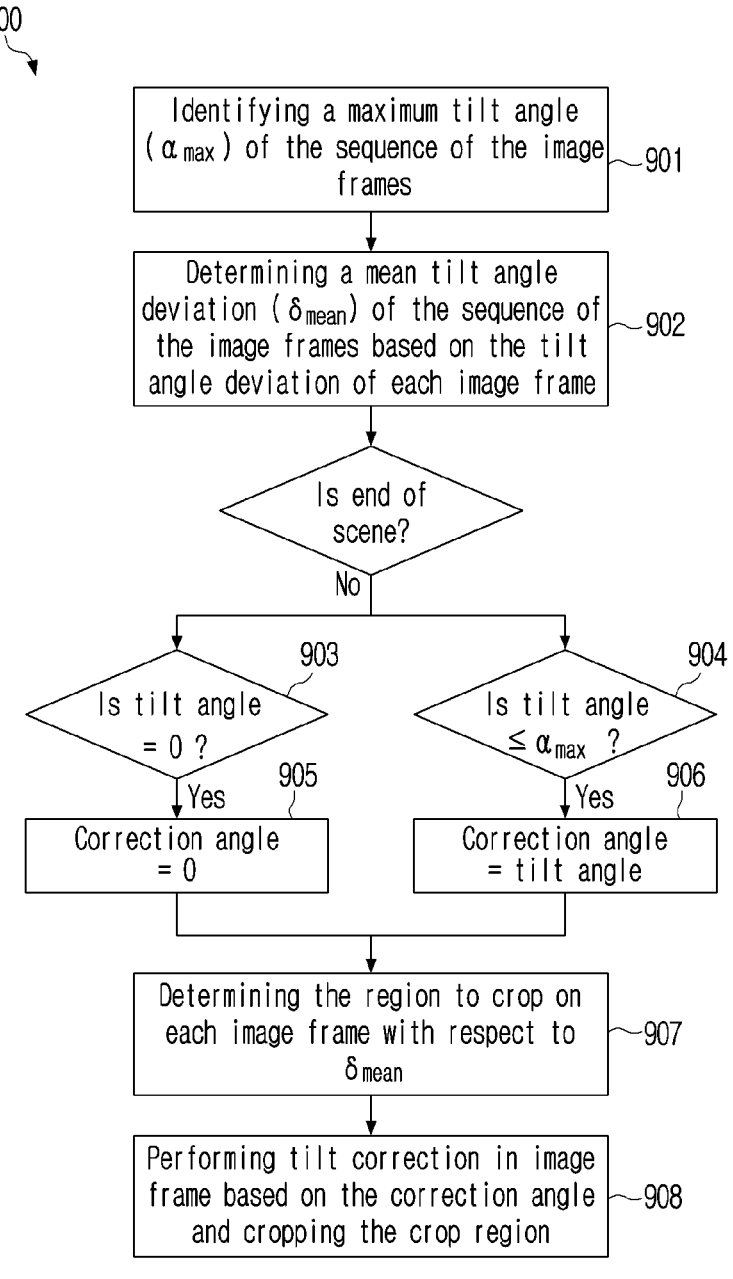
FIG. 9 is a flow diagram illustrating a method for large (e.g., maximum) tilt correction at the image frame, according to an example embodiment.

FIG. 9 is a flow diagram (900) illustrating a method for maximum tilt correction at the image frame, according to an embodiment as disclosed herein. In an embodiment, the method allows the tilt correction controller (110) to perform steps 901-908 of the flow diagram (900). At step 901, the method includes identifying the maximum tilt angle ($\alpha_{max}$) of the sequence of image frames based on the tilt angle of each image frame. At step 902, the method includes determining the mean tilt angle deviation ($\delta_{mean}$) of the sequence of image frames based on the tilt angle deviation of each image frame. When the scene does not end after the step 902, at steps 903-904, the method includes determining whether the tilt angle of an image frame of the sequence of image frames is one of equal to zero, and smaller than or equal to the maximum tilt angle.

At step 905, the method includes estimating the angle to correct tilt of the image frame as zero (e.g. correction angle=0), in response to determining that the tilt angle of the image frame is equal to zero. At step 906, the method includes estimating the angle to correct tilt of the image frame as the tilt angle (e.g. correction angle=tilt angle), in response to determining that the tilt angle of the image frame is smaller than or equal to the maximum tilt angle. At step 907, the method includes determining the region to crop on each image frame based on the mean tilt angle deviation. At step 908, the method includes performing tilt correction in the image frame based on the correction angle and cropping the crop region.

Figure 10:
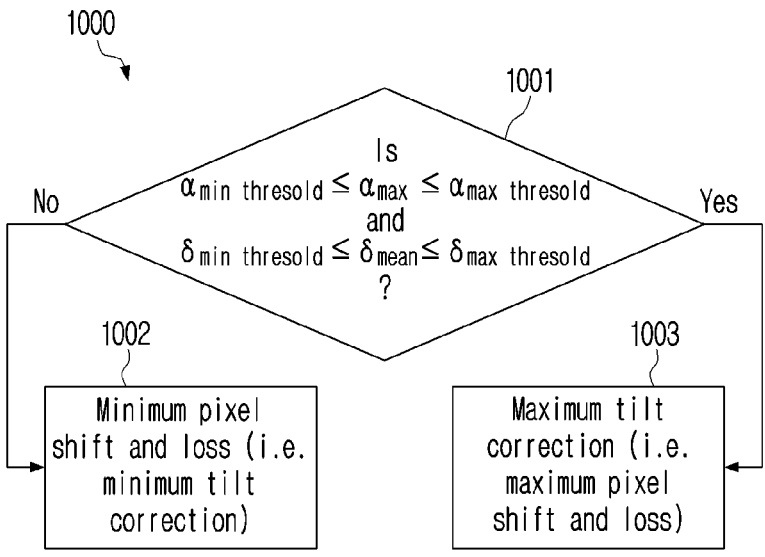
FIG. 10 is a flow diagram illustrating a method for choosing the tilt correction with the minimum or reduced pixel shift and loss or the large (e.g., maximum) pixel shift and loss, according to an example embodiment.

FIG. 10 is a flow diagram (1000) illustrating a method for choosing the tilt correction with the minimum pixel shift and loss or the maximum pixel shift and loss, according to an embodiment as disclosed herein. In an embodiment, the method allows the tilt correction controller (110) to perform steps 1001-1003 of the flow diagram (1000). At step 1001, the method includes determining whether the maximum tilt angle ($\alpha_{max}$) and the mean tilt angle deviation ($\delta_{mean}$) of the sequence of image frames meets the second threshold condition based on the pixel shift and loss. The second threshold condition is minimum tilt angle threshold ($\alpha_{min\ threshold}$) ≤maximum tilt angle ($\alpha_{max}$)≤maximum tilt angle threshold ($\alpha_{max\ threshold}$), and minimum tilt angle deviation threshold ($\delta_{min\ threshold}$) mean tilt angle deviation ($\delta_{mean}$)≤maximum tilt angle threshold ($\delta_{max\ threshold}$). As an example, the minimum tilt angle threshold can be set as 0.90 and maximum tilt angle threshold can be set at 0.95. As an example, the maximum tilt angle threshold can be set at 0.95. As an example, the minimum tilt angle deviation threshold can be set as 0. As an example, the maximum tilt angle deviation threshold can be set as 10

At step 1002, the method includes performing the target tilt correction with minimum pixel shift and loss (e.g. minimum tilt correction), in response to determining that the maximum tilt angle and the mean tilt angle deviation of the sequence of image frames do not meet the second threshold condition. At step 1003, the method includes performing the target tilt correction with maximum tilt correction (e.g. maximum pixel shift and loss), in response to determining that the maximum tilt angle and the mean tilt angle deviation of the sequence of image frames meet the second threshold condition.

Figure 11:
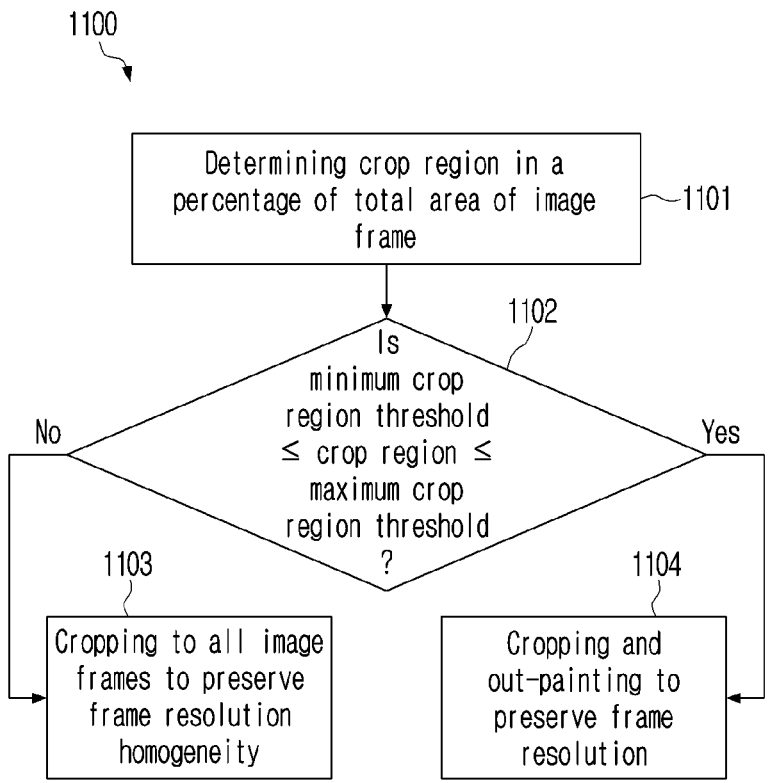
FIG. 11 is a flow diagram illustrating a method for selecting cropping and/or out-painting of the image frame for the tilt correction, according to an example embodiment.

FIG. 11 is a flow diagram (1100) illustrating a method for selecting cropping and/or out-painting of the image frame for the tilt correction, according to an embodiment as disclosed herein. In an embodiment, the method allows the tilt correction controller (110) to perform steps 1101-1104 of the flow diagram (1100). At step 1101, the method includes determining the crop region on the image frame in a percentage of total area of the image frame. At step 1102, the method includes determining whether the crop region on each image frame meets the third threshold condition. The third threshold condition is minimum crop region threshold≤crop region≤maximum crop region threshold. The crop region threshold can be computed as a combination of a crop region percentage of a full image and an importance of the crop region.

The crop region percentage can be computed as a function of the tilt angle. The importance of crop region can be computed based on a look up table that can assign a score based on occurrence of people, documents and if crop region is part of salient region of the full image. Assuming that the lookup table has a minimum score of 0 and maximum score of 100, the minimum crop region threshold can be set at 5 and the maximum crop region threshold may be set at 35. At step 1103, the method includes cropping the sequence of image frames, in response to determining that the region to crop on each image does not meet the third threshold condition. At step 1104, the method includes cropping and out-painting the sequence of image frames, in response to determining that the region to crop on each image meets the third threshold condition.

Figure 12:
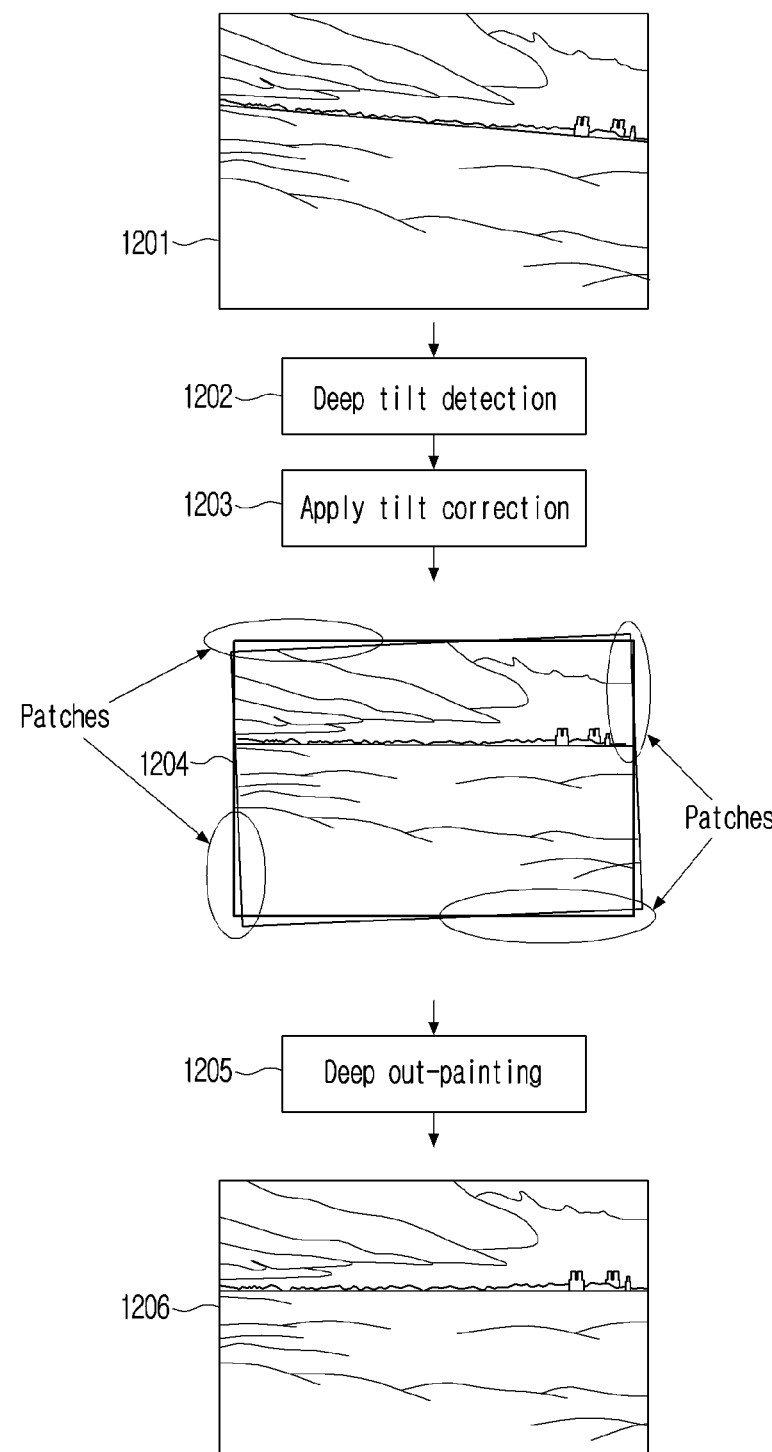
FIG. 12 is a flow diagram illustrating a method for tilt correction of the image frame, according to an example embodiment.

FIG. 12 is a flow diagram (1200) illustrating a method for tilt correction of the image frame, according to an embodiment as disclosed herein. In an embodiment, the method allows the tilt correction controller (110) to perform steps 1201-1206 of the flow diagram (1200). At step 1201, the method includes receiving the image frame with tilt. At step 1202, the method includes detecting the tilt in the image frame. At step 1203, the method includes determining the tilt correction required in the image frame, and applying the tilt correction to the image frame. At step 1204, the method includes detecting black patches (or black padding) formed on peripheral region of the image frame due to applying the tilt correction. At step 1205, the method includes determining the out-painting required on the black patches and applies the out-painting on the black patches. At step 1206, the method includes providing the image frame without tilt and keeping a resolution of the image frame as per the received image frame.

The various actions, acts, blocks, steps, or the like in the flow diagrams (300, 800, 900, 1000, 1100, 1200) may be performed in the order presented, in a different order, or simultaneously. Further, in some embodiments, some of the actions, acts, blocks, steps, or the like may be omitted, added, modified, skipped, or the like without departing from the scope.

Figure 13:
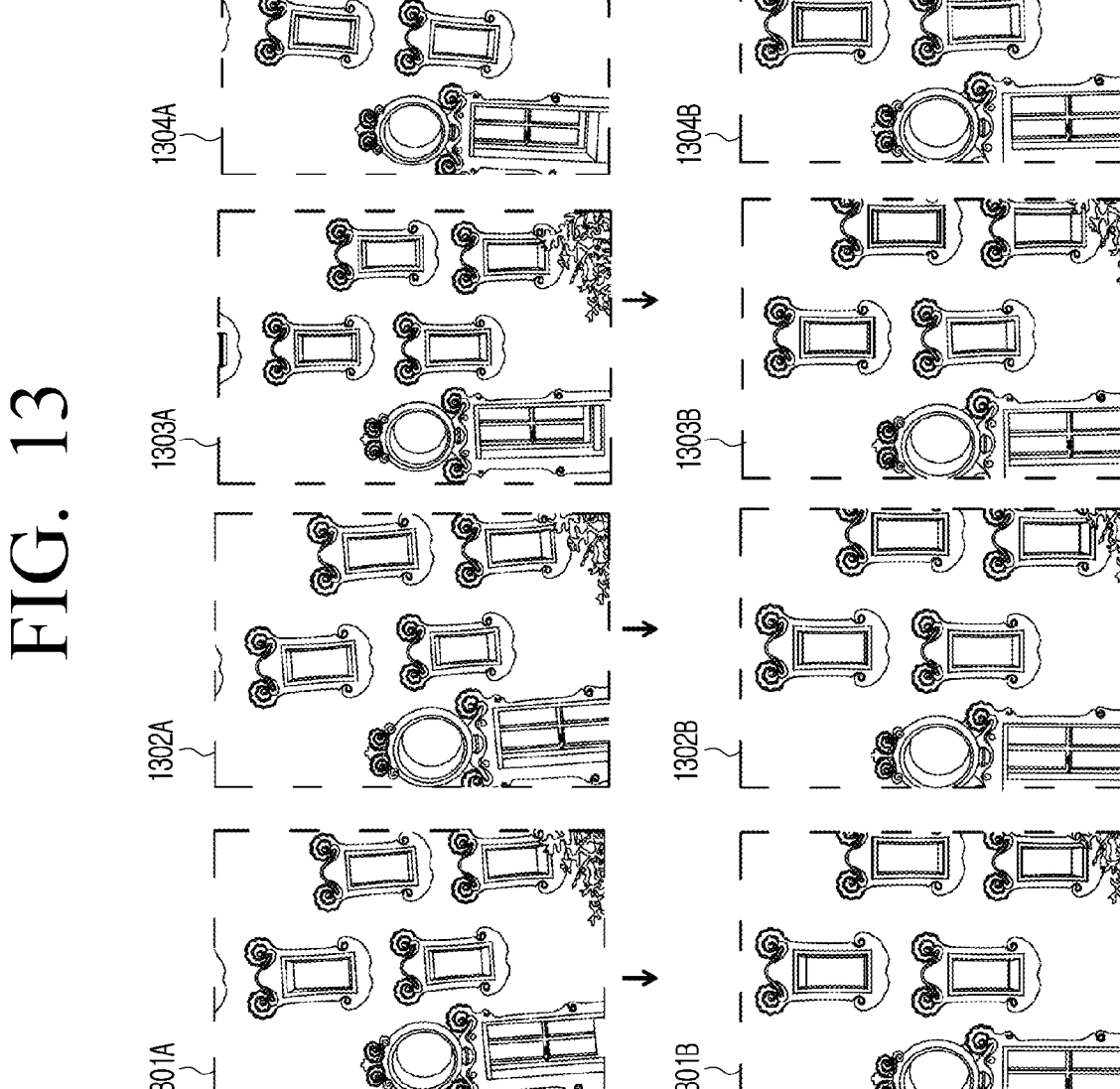
FIG. 13 illustrates the image frames with tilt and tilt corrected image frames, where the tilt is corrected by minimizing or reducing a pixel shift and loss from the image frame, according to an example embodiment.

FIG. 13 illustrates the image frames with tilt and the tilt corrected image frames, where the tilt is corrected by minimizing the pixel shift and loss from the image frame, according to an embodiment as disclosed herein. 1301A-1304A are image frames with the tilt of an example scene span. Consider, the electronic device (100) chooses the tilt correction by minimizing the pixel shift and loss from the image frames (1301A-1304A). Then, the electronic device (100) reduces the tilts in the image frames (1301A-1304A) by minimizing the pixel shift and loss, and provides the image frame (1301B-1304B) for the scene span. The electronic device (100) ensures least data loss due to cropping of out of border region of the image frames (1301A-1304A). But, the image frames (1301B-1304B) still have some tilt with respect to the image frame with minimum tilt distortion.

Figure 14:
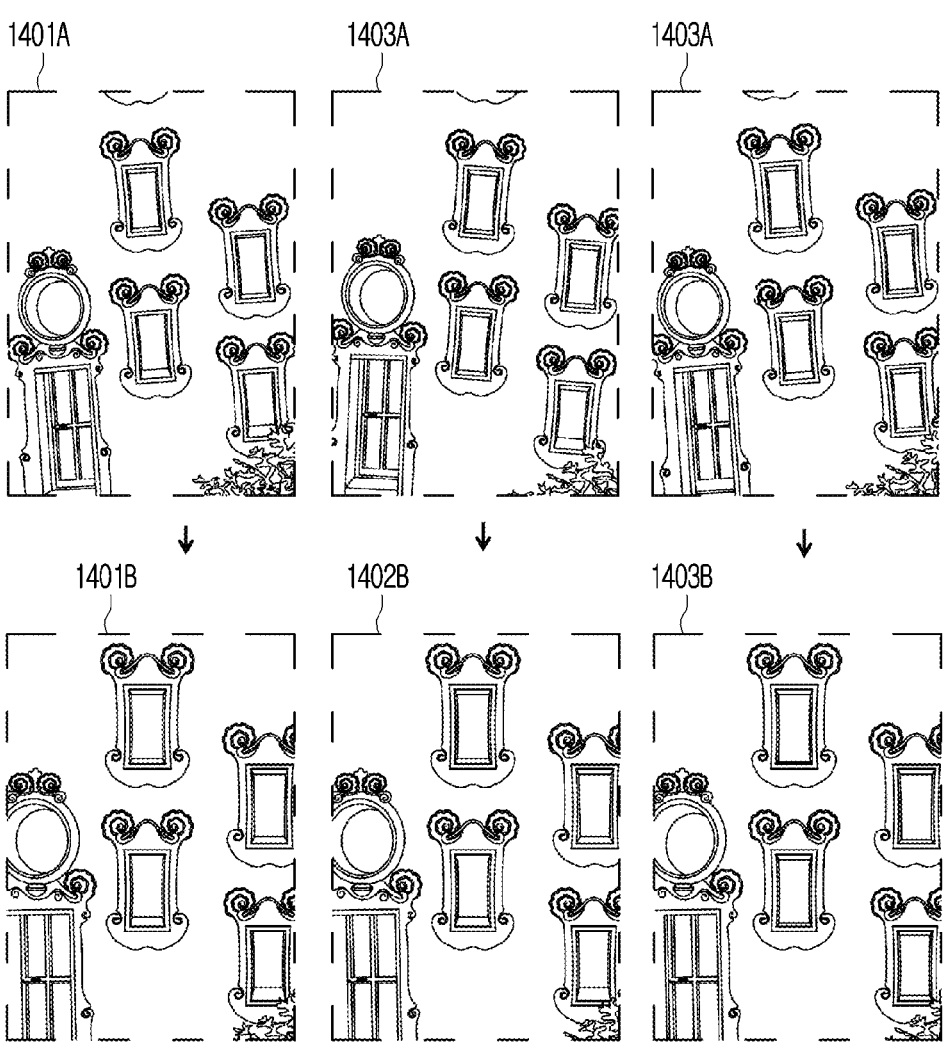
FIG. 14 illustrates the image frames with tilt and the tilt corrected image frames, where the tilt is corrected by maximizing the tilt correction of the image frame, according to an example embodiment.

FIG. 14 illustrates the image frames with tilt and the tilt corrected image frames, where the tilt is corrected by maximizing the tilt correction of the image frame, according to an embodiment as disclosed herein. 1401A-1403A are image frames with tilt of the example scene span. Consider, the electronic device (100) chooses the tilt correction by maximizing the tilt correction of the image frames (1401A-

1403A). Then, the electronic device (100) reduces the tilts in the image frames (1401A-1403A) by maximizing the tilt correction without bothering about the minimizing the pixel shift and loss, which results in higher the pixel shift and data loss in an out of border region as the crop region is calculated based on the highest angle correction applied.

Figure 15:
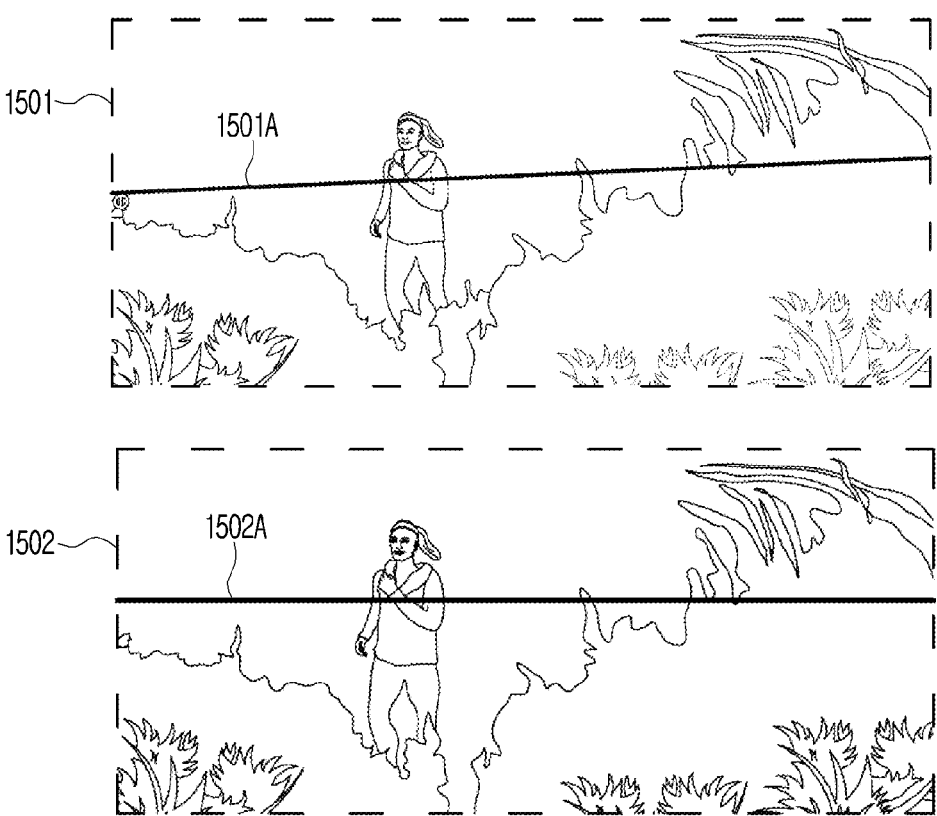
FIG. 15 illustrates an example scenario of correcting tilt in an image, according to an example embodiment.

FIG. 15 illustrates an example scenario of correcting tilt in the image, according to an embodiment as disclosed herein. 1501 is an image frame containing tilt, whereas 1502 is the image frame generated by the electronic device (100) after correcting the tilt in the image (1501). 1501A represents horizon behind a person in the image (1501), that appears tilted to the left. 1502A represents the horizon behind the person in the image (1502), where the horizon is orthogonal to gravity vector and doesn't appear tilted in the image (1502) after the tilt correction, which improves aesthetics of the image frame and gives professional cinematographic impact to a recorded video.

Figure 16:
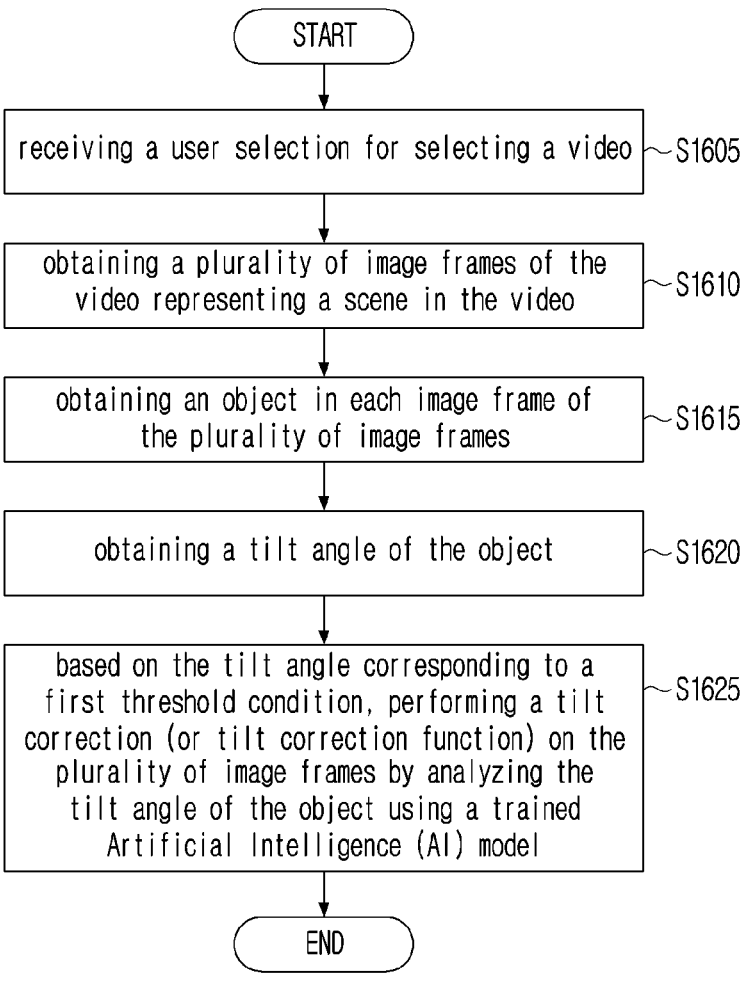
FIG. 16 is a flow diagram illustrating a method for controlling an electronic device, according to an example embodiment.

FIG. 16 is a flow diagram illustrating a method for controlling an electronic device, according to an embodiment.

A method for controlling an electronic device comprises receiving a user selection (or user input) for selecting a video (or content) (S1605), obtaining a plurality of image frames of the video representing a scene in the video (S1610), obtaining an object in each image frame of the plurality of image frames (S1615), obtaining a tilt angle of the object (S1620)and based on the tilt angle corresponding to a first threshold condition, performing a tilt correction (or tilt correction function) on the plurality of image frames by analyzing the tilt angle of the object using a trained Artificial Intelligence (AI) model (S1625).

According to one or more embodiments, even if there are a plurality of objects in each image frame, the tilt angle itself of each image frame may be determined by one object. This is because the tilt angle of each image frame is generally caused by the rotation of a camera (or an image sensor). There is a high possibility that the tilt angle of each of the plurality of objects is the same.

The object may be a target object capable of representing a horizontal line. Thus, the object may be described as a target object.

The tilt angle of the object may mean a tilt angle between a horizontal line of the object and a horizontal line of each image frame.

The horizontal line of the object may be different according to the type of object. In addition, the method of obtaining a tilt angle of the object may vary according to the type of object.

For example, the tilt of each image frame may be obtained based on an angular difference between a measured horizontal line of a building object and a reference horizontal line of each image frame.

For example, when there are a plurality of objects in each image frame, the tilt angle of each image frame may be determined based on the tilt angles of the plurality of objects.

Each image frame may include a plurality of objects. Based on each image frame including a plurality of objects, the method comprises obtaining a representative tilt angle of each image frame. The method comprises obtaining a representative tilt angle of each image frame by using an average tilt angle.

For example, based on a first image frame including a first object and a second object, the method comprises obtaining a representative tilt angle of the first image frame. The method comprises obtaining a first tilt angle of the first object and a second tilt angle of the second object. The method comprises obtaining an average tilt angle based on the first tilt angle and the second tilt angle. The method comprises obtaining the representative tilt angle of the first image frame based on the average tilt angle.

The method further comprising determining whether the tilt angle corresponds to the first threshold condition using the trained AI model and based on the tilt angle being greater than a first threshold angle, determining the tilt angle corresponds to the first threshold condition.

Each embodiment herein may be used in combination with any other embodiment(s) described herein.

The performing the tilt correction on the plurality of image frames comprises obtaining a tilt angle of each image frame based on the object in each image frame. The tilt angle of each image frame may be written as a representative tilt angle of each image frame.

The performing the tilt correction on the plurality of image frames comprises obtaining a tilt angle deviation of each image frame, wherein the tilt angle deviation of an image frame of the plurality of image frames is an absolute value of difference between the tilt angle of the image frame and a mean of the tilt angles of the image frame and an adjacent image frame of the plurality of image frames.

The performing the tilt correction on the plurality of image frames comprises obtaining a pixel shift and loss in each image frame and a region to crop on each image frame based on the tilt angle deviation and the tilt angle.

The performing the tilt correction on the plurality of image frames comprises obtaining a target tilt correction required for each image frame based on the pixel shift and loss.

The performing the tilt correction on the plurality of image frames comprises applying the target tilt correction and at least one of cropping and out-painting on the obtained region of each image frame.

The performing the tilt correction on the plurality of image frames comprises stitching each tilt corrected image frame to rebuild the scene.

The performing the tilt correction on the plurality of image frames comprises generating a video by sequentially joining stitched image frames.

The obtaining the tilt angle of each image frame comprises obtaining a range of possible tilt angles of each image frame using a trained self-attention model and obtaining the tilt angle by obtaining a weighted mean of the predicted tilt angles with a standard deviation of zero or a larger value.

The self-attention model is trained for tilt angle prediction by: obtaining a range of possible tilt angles of training image frames based on relative position of objects in the training image frames, relevance of the objects and relationship between the objects, generating training data using the range of possible tilt angles, generating an output vector with distributed probability by performing multi-label training on the training data and training the self-attention model with the output vector using a sigmoid activation for tilt angle prediction.

The obtaining the pixel shift and loss in each image frame and the region to crop on each image frame comprises obtaining a minimum tilt angle of the plurality of image frames based on the tilt angle of each image frame, obtaining a mean tilt angle deviation of the plurality of image frames based on the tilt angle deviation of each image frame and determining whether the minimum tilt angle is greater than the mean tilt angle deviation.

The obtaining the pixel shift and loss in each image frame and the region to crop on each image frame comprises performing one of: (a) setting the mean tilt angle deviation to the minimum tilt angle and obtaining an angle to correct tilt of each image frame, based on the minimum tilt angle being greater than the mean tilt angle deviation and (b) obtaining the angle to correct tilt of each image frame, based on the minimum tilt angle being not greater than the mean tilt angle deviation and (c) obtaining the region to crop on each image frame based on the mean tilt angle deviation, wherein the target tilt correction is with minimum pixel shift and loss.

The obtaining the angle to correct tilt of each image frame comprises determining whether the tilt angle of an image frame of the plurality of image frames is one of equal to zero, smaller than or equal to mean tilt angle deviation and greater than then mean tilt angle deviation.

The obtaining the angle to correct tilt of each image frame comprises performing one of: (a) obtaining the angle to correct tilt of the image frame as zero, based on the tilt angle of the image frame being equal to zero, (b) obtaining the angle to correct tilt of the image frame as the tilt angle, based on the tilt angle of the image frame being smaller than or equal to the mean tilt angle deviation and (c) obtaining the angle to correct tilt of the image frame as the mean tilt angle deviation, based on the tilt angle of the image frame being greater than the mean tilt angle deviation.

The obtaining the pixel shift and loss in each image frame and the region to crop on each image frame based on the tilt angle deviation and the tilt angle comprises obtaining a maximum tilt angle of the plurality of image frames based on the tilt angle of each image frame, obtaining a mean tilt angle deviation of the plurality of image frames based on the tilt angle deviation of each image frame and determining whether the tilt angle of an image frame of the plurality of image frames is one of equal to zero and smaller than or equal to the maximum tilt angle.

The obtaining the pixel shift and loss in each image frame and the region to crop on each image frame based on the tilt angle deviation and the tilt angle comprises performing one of: (a) obtaining the angle to correct tilt of the image frame as zero, based on the tilt angle of the image frame being equal to zero (b) obtaining the angle to correct tilt of the image frame as the tilt angle, based on the tilt angle of the image frame being smaller than or equal to the maximum tilt angle and (c) obtaining the region to crop on each image frame based on the mean tilt angle deviation, wherein the target tilt correction is with maximum pixel shift and loss.

The obtaining the target tilt correction required for each image frame based on the pixel shift and loss comprises determining whether a maximum tilt angle and a mean tilt angle deviation of the plurality of image frames correspond to a second threshold condition based on the pixel shift and loss.

The obtaining the target tilt correction required for each image frame based on the pixel shift and loss comprises performing one of: (a) the target tilt correction with maximum pixel shift and loss, based on the maximum tilt angle and the mean tilt angle deviation of the plurality of image frames corresponding to the second threshold condition and (b) the target tilt correction with minimum pixel shift and loss, based on the maximum tilt angle and the mean tilt angle deviation of the plurality of image frames do not corresponding to the second threshold condition.

The applying the target tilt correction and cropping to each image frame on the obtained region of each image frame comprises rotating each image frame based on an obtained angle to correct tilt of the image frame and cropping the obtained region on each image frame based on the mean tilt angle deviation.

The applying at least one of cropping and out-painting on the obtained region of each image frame comprises determining whether a region to crop on each image frame corresponds to a third threshold condition.

The applying at least one of cropping and out-painting on the obtained region of each image frame comprises performing one of: (a) cropping the plurality of image frames, based on the region to crop on each image not corresponding to the third threshold condition and (b) cropping and out-painting the plurality of image frames, based on the region to crop on each image corresponding to the third threshold condition. "Based on" as used herein covers based at least on.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. A method for tilt correction of a video by an electronic device, the method comprising:
   receiving a user selection of the video;
   identifying a sequence of image frames of the video representing a scene in the video;
   determining a degree of tilt in each image frame of the sequence of image frames;
   determining whether the degree of tilt in each image frame meets a first threshold condition using a trained Artificial Intelligence (AI) model;
   determining that cause of tilt in the sequence of image frames is un-intentional based on the degree of tilt in each image frame meeting the first threshold condition; and
   performing the tilt correction on the sequence of image frames based on the cause of tilt being un-intentional.

2. The method as claimed in claim 1, wherein performing the tilt correction on the sequence of image frames, comprises:
   estimating a tilt angle of each image frame for maximum tilt correction at each image frame;
   determining a tilt angle deviation of each image frame, wherein the tilt angle deviation of an image frame of the sequence of image frames is an absolute value of difference between the tilt angle of the image frame and a mean of the tilt angles of the image frame and an adjacent image frame of the sequence of image frames;

estimating a pixel shift and loss in each image frame and a region to crop on each image frame based on the tilt angle deviation and the tilt angle;

determining a target tilt correction required for each image frame based on the pixel shift and loss;

applying the target tilt correction, and at least one of cropping and out-painting on the determined region of each image frame;

stitching each tilt corrected image frame to rebuild the scene; and generating a video at least by sequentially joining stitched image frames.

3. The method as claimed in claim 2, wherein estimating the tilt angle of each image frame for the maximum tilt correction at each image frame, comprises:

predicting a range of possible tilt angles of each image frame using a trained self-attention model; and determining the tilt angle at least by determining a weighted mean of the predicted tilt angles with a standard deviation of zero or a larger value.

4. The method as claimed in claim 3, wherein a self-attention model is trained for tilt angle prediction at least by:

determining a range of possible tilt angles of training image frames based on relative position of objects in the training image frames, relevance of the objects, and relationship between the objects;

generating training data using the range of possible tilt angles;

generating an output vector with distributed probability at least by performing multi-label training on the training data; and training the self-attention model with the output vector using a sigmoid activation for tilt angle prediction.

5. The method as claimed in claim 2, wherein estimating the pixel shift and loss in each image frame and the region to crop on each image frame based on the tilt angle deviation and the tilt angle, comprises:

identifying a minimum tilt angle of the sequence of image frames based on the tilt angle of each image frame;

determining a mean tilt angle deviation of the sequence of image frames based on the tilt angle deviation of each image frame;

determining whether the minimum tilt angle is greater than the mean tilt angle deviation;

performing at least one of:

setting the mean tilt angle deviation to the minimum tilt angle, and estimating an angle to correct tilt of each image frame, based on the minimum tilt angle being greater than the mean tilt angle deviation, and estimating the angle to correct tilt of each image frame, based on the minimum tilt angle being not greater than the mean tilt angle deviation; and determining the region to crop on each image frame based on the mean tilt angle deviation, wherein the target tilt correction is with minimum pixel shift and loss.

6. The method as claimed in claim 5, wherein estimating the angle to correct tilt of each image frame, comprises:

determining whether the tilt angle of an image frame of the sequence of image frames is one of equal to zero, smaller than or equal to mean tilt angle deviation, and greater than then mean tilt angle deviation; and performing at least one of:

estimating the angle to correct tilt of the image frame as zero, based on the tilt angle of the image frame being equal to zero, estimating the angle to correct tilt of the image frame as the tilt angle, based on the tilt angle of the image frame being smaller than or equal to the mean tilt angle deviation, and estimating the angle to correct tilt of the image frame as the mean tilt angle deviation, based on the tilt angle of the image frame being greater than the mean tilt angle deviation.

7. The method as claimed in claim 2, wherein estimating the pixel shift and loss in each image frame and the region to crop on each image frame based on the tilt angle deviation and the tilt angle, comprises:

identifying a maximum tilt angle of the sequence of image frames based on the tilt angle of each image frame;

determining a mean tilt angle deviation of the sequence of image frames based on the tilt angle deviation of each image frame;

determining whether the tilt angle of an image frame of the sequence of image frames is one of equal to zero, and smaller than or equal to the maximum tilt angle;

performing at least one of:

estimating the angle to correct tilt of the image frame as zero, based on the tilt angle of the image frame being equal to zero, and estimating the angle to correct tilt of the image frame as the tilt angle, based on the tilt angle of the image frame being smaller than or equal to the maximum tilt angle; and determining the region to crop on each image frame based on the mean tilt angle deviation, wherein the target tilt correction is with maximum pixel shift and loss.

8. The method as claimed in claim 2, wherein determining the target tilt correction required for each image frame based on the pixel shift and loss, comprises:

determining whether a maximum tilt angle and a mean tilt angle deviation of the sequence of image frames meet a second threshold condition based on the pixel shift and loss; and performing at least one of:

the target tilt correction with maximum pixel shift and loss, based on the maximum tilt angle and the mean tilt angle deviation of the sequence of image frames meeting the second threshold condition, and the target tilt correction with minimum pixel shift and loss, based on the maximum tilt angle and the mean tilt angle deviation of the sequence of image frames do not meeting the second threshold condition.

9. The method as claimed in claim 2, wherein applying the target tilt correction and cropping to each image frame on the determined region of each image frame, comprises:

rotating each image frame based on an estimated angle to correct tilt of the image frame; and cropping the determined region on each image frame based on the mean tilt angle deviation.

10. The method as claimed in claim 2, wherein applying at least one of cropping and out-painting on the determined region of each image frame, comprises:

determining whether a region to crop on each image frame meets a third threshold condition; and performing at least one of:

cropping the sequence of image frames, based on the region to crop on each image not meeting the third threshold condition, and cropping and out-painting the sequence of image frames, based on the region to crop on each image meeting the third threshold condition.

11. An electronic device for tilt correction of a video, comprises:

a memory;

at least one processor comprising processor circuitry;

a tilt correction controller comprising processing circuitry, coupled to the memory and the at least one processor, the tilt correction controller configured for:

receiving a user selection of the video, identifying a sequence of image frames of the video representing a scene in the video, determining a degree of tilt in each image frame of the sequence of image frames, determining whether the degree of tilt in each image frame meets a first threshold condition using a trained Artificial Intelligence (AI) model;

determining that cause of tilt in the sequence of image frames is un-intentional based on the degree of tilt in each image frame meeting the first threshold condition; and performing the tilt correction on the sequence of image frames based on the cause of tilt being un-intentional.

12. The electronic device as claimed in claim 11, wherein performing the tilt correction on the sequence of image frames, comprises:

estimating a tilt angle of each image frame for maximum tilt correction at each image frame;

determining a tilt angle deviation of each image frame, wherein the tilt angle deviation of an image frame of the sequence of image frames is an absolute value of difference between the tilt angle of the image frame and a mean of the tilt angles of the image frame and an adjacent image frame of the sequence of image frames;

estimating a pixel shift and loss in each image frame and a region to crop on each image frame based on the tilt angle deviation and the tilt angle;

determining a target tilt correction required for each image frame based on the pixel shift and loss;

applying the target tilt correction, and at least one of cropping and out-painting on the determined region of each image frame;

stitching each tilt corrected image frame to rebuild the scene; and generating a video at least by sequentially joining stitched image frames.

13. The electronic device as claimed in claim 12, wherein estimating the tilt angle of each image frame for the maximum tilt correction at each image frame, comprises:

predicting a range of possible tilt angles of each image frame using a trained self-attention model; and determining the tilt angle at least by determining a weighted mean of the predicted tilt angles with a standard deviation of zero or a larger value.

* * * * *